(12) United States Patent
Hui et al.

(10) Patent No.: US 9,369,177 B2
(45) Date of Patent: Jun. 14, 2016

(54) PATH DIVERSITY WITH POLY-PHASE LINKS IN A POWER LINE COMMUNICATION NETWORK

(71) Applicant: Cisco Technology, Inc., San Jose, CA (US)

(72) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/267,445

(22) Filed: May 1, 2014

(65) Prior Publication Data

US 2015/0318892 A1 Nov. 5, 2015

(51) Int. Cl.
*H04B 3/32* (2006.01)
*H04B 3/54* (2006.01)
*H04B 3/487* (2015.01)
*H04W 40/16* (2009.01)
*H04L 12/721* (2013.01)

(52) U.S. Cl.
CPC .................. *H04B 3/32* (2013.01); *H04B 3/487* (2015.01); *H04B 3/54* (2013.01); *H04W 40/16* (2013.01); *H04B 2203/5425* (2013.01); *H04B 2203/5466* (2013.01); *H04L 45/123* (2013.01)

(58) Field of Classification Search
CPC .... H04B 3/32; H04B 3/54; H04B 2203/5466; H04B 7/0413; H04B 2203/5416; H04B 2203/5483; H04B 7/0682; H04B 2203/5445; H04B 2203/5495; H04B 3/56; H04B 7/0689; H04B 7/10; H04B 7/048; H04B 2203/5425; H04B 3/487; H04L 45/123; H04W 40/16
See application file for complete search history.

(56) References Cited

U.S. PATENT DOCUMENTS

| | | | |
|---|---|---|---|
| 8,515,382 B2 | 8/2013 | Schwager et al. | |
| 8,542,754 B2 * | 9/2013 | Guerrieri ............... | H04B 3/542 370/252 |
| 2008/0260010 A1 * | 10/2008 | Schwager ................ | H04B 3/54 375/222 |
| 2011/0026621 A1 * | 2/2011 | Kim ........................ | H04B 3/54 375/260 |
| 2011/0110408 A1 * | 5/2011 | Schwager et al. ............ | 375/222 |
| 2012/0161543 A1 | 6/2012 | Reuven et al. | |
| 2012/0182881 A1 | 7/2012 | Ananthakrishnan et al. | |

(Continued)

OTHER PUBLICATIONS

Egan, J., "Multiple Input, Multiple Output Technology Accelerates Wired Home Networks", HomeGrid Forum White Paper, Version 1.0, Jun. 2012, 13 pages, HomeGrid Forum.

(Continued)

*Primary Examiner* — Hirdepal Singh
(74) *Attorney, Agent, or Firm* — Parker Ibrahim & Berg LLC; James M. Behmke; Kenneth J. Heywood

(57) ABSTRACT

In one embodiment, a node in a network receives communication channel data regarding one or more communication channels available between a particular device in the network and a neighboring device. Each communication channel corresponds to one or more electrical phases over which the particular device can communicate with the neighboring device. The node also receives crosstalk data regarding an amount of crosstalk between the electrical phases over which the particular device can communicate with the neighboring device. The node then generates a routing path for the network based on the received crosstalk and communication channel data.

18 Claims, 24 Drawing Sheets

(56) References Cited

U.S. PATENT DOCUMENTS

| | | | |
|---|---|---|---|
| 2012/0219075 A1* | 8/2012 | Spencer | H04B 3/54 375/257 |
| 2012/0320768 A1* | 12/2012 | Shaffer et al. | 370/252 |
| 2013/0051446 A1* | 2/2013 | Vijayasankar | H04B 3/54 375/224 |
| 2014/0112400 A1* | 4/2014 | Reuven | 375/258 |
| 2014/0233662 A1* | 8/2014 | Hansell | G05B 13/02 375/258 |

OTHER PUBLICATIONS

Winter, et al., "RPL: IPv6 Routing Protocol for Low-Power and Lossy Networks", Request for Comments 6550, Mar. 2012, 157 pages, Internet Engineering Task Force Trust.

Mauro Biagi: "MIMO self-interference mitigation effects on PLC relay networks," Power Line Communications and Its Applications (ISPLC), 2011 IEEE International Symposium on, IEEE, Apr. 3, 2011, pp. 182-186.

M. Biagi et al.: "Location Assisted Routing Techniques for Power Line Communication in Smart Grids," Smart Grid Communications (SMARTGRIDCOMM) 2010 First IEEE International Conference on, IEEE, Piscataway, NJ, USA, Oct. 4, 2010, pp. 274-278.

"ITU-T Unified high-speed wireline-based home networking transceivers—Multiple input/multiple output specification—G.9963", Jun. 22, 2012, pp. 1-90.

* cited by examiner

PATH DIVERSITY WITH POLY-PHASE LINKS IN A POWER LINE COMMUNICATION NETWORK

TECHNICAL FIELD

The present disclosure relates generally to power line communication (PLC) networks, and, more particularly, to path diversity with poly-phase links in a PLC network.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Shared-media communication networks, such as power-line communication (PLC) networks (a type of communication over power-lines), provide an enabling technology for networking communication and can be used for example in advanced metering infrastructure (AMI) networks, and are also useful within home and buildings. The transfer of alternating current (AC) electric power to the end users in such networks most frequently takes the form of three-phase electric power, where three current waveforms are produced that are generally equal in magnitude and 120° out of phase to each other. Typically, a device is connected to one or all three phases and may use any connected phase for purposes of communicating in the network. However, crosstalk effects may also be present in the network, causing a signal to propagate from the originating phase onto one or more other electrical phases. Accordingly, current techniques for communicating in multi-phase PLC networks offer significant room for improvement.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
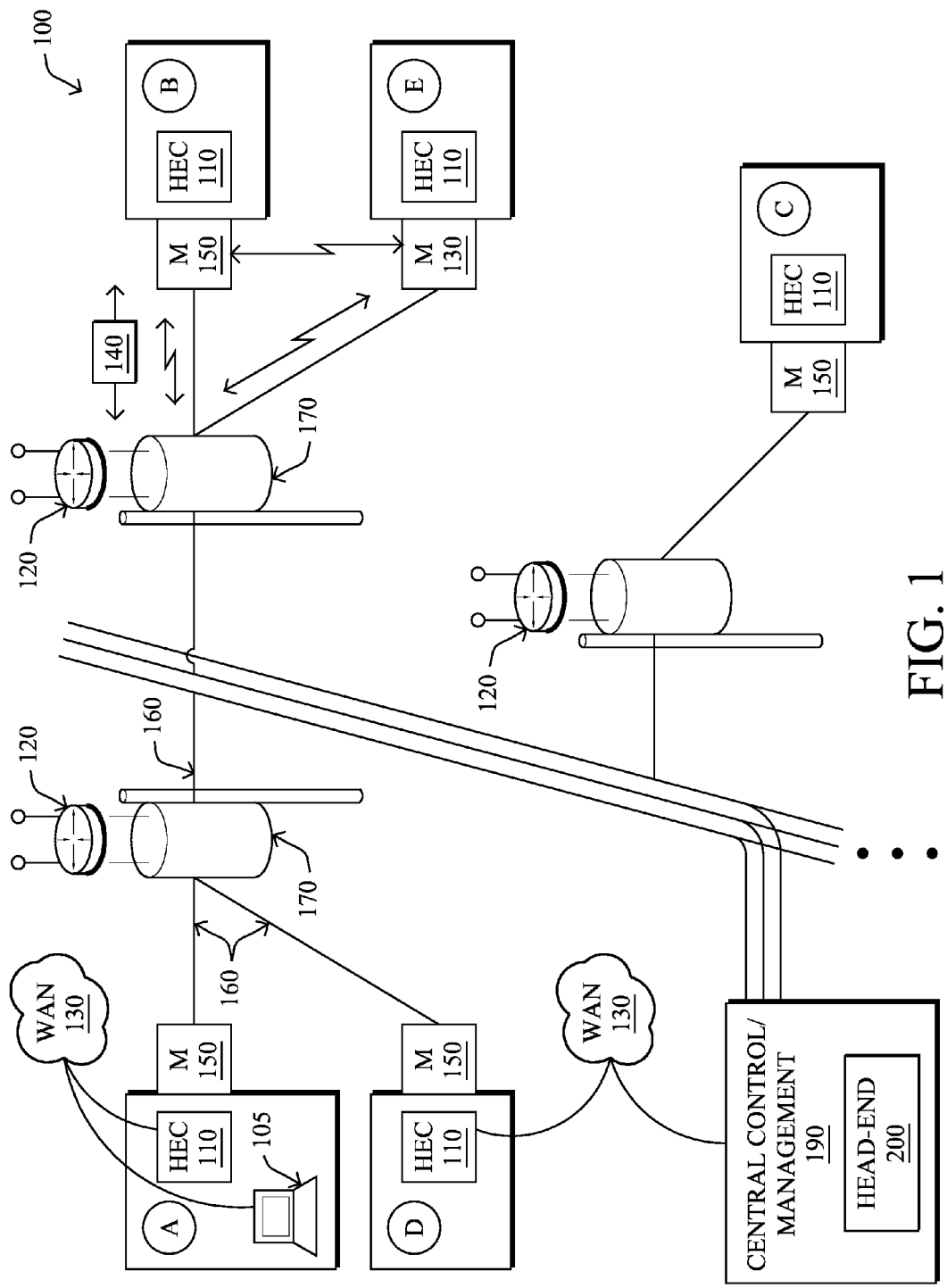
FIG. 1 illustrates an example network of devices shown with various communication and powering configurations.

According to one or more embodiments of the disclosure, a node in a network receives communication channel data regarding one or more communication channels available between a particular device in the network and a neighboring device. Each communication channel corresponds to one or more electrical phases over which the particular device can communicate with the neighboring device. The node also receives crosstalk data regarding an amount of crosstalk between the electrical phases over which the particular device can communicate with the neighboring device. The node then generates a routing path for the network based on the received crosstalk and communication channel data.

Description

A computer network is a geographically distributed collection of nodes interconnected by communication links and segments for transporting data between end nodes, such as personal computers and workstations, or other devices, such as sensors, utility meters, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE 1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, in particular, are a specific type of network having spatially distributed autonomous devices such as sensors, actuators, etc. For example, sensor networks, such as for "Smart Grid" and "Smart Cities" (e.g., for Advanced Metering Infrastructure or "AMI" applications), may cooperatively monitor physical or environmental conditions at different locations, such as, e.g., energy/power consumption, resource consumption, etc. Another type of smart object includes actuators, e.g., responsible for turning on/off an engine or perform any other actions. Generally, smart object networks may include any type of device that is able to communicate information on a computer network, such as household appliances (air conditioners, refrigerators, lights, etc.), industrial devices (heating, ventilating, and air conditioning (HVAC), pumps, motors, etc.), and other "smart" devices.

That is, smart object networks are typically interconnected by a communication network, such as a wireless network, though wired connections are also available, and may often consist of wireless nodes in communication within a field area network (FAN). For instance, each smart device (node) in a smart object network may generally be equipped with a radio transceiver or other communication port, a microcontroller, and an energy source, such as a battery (or, in particular to the embodiments herein, a distribution grid power source). Typically, size and cost constraints on sensor nodes result in corresponding constraints on resources such as energy, memory, computational power and bandwidth. Correspondingly, a reactive routing protocol may, though need not, be used in place of a proactive routing protocol for sensor networks.

FIG. 1 is a schematic block diagram of an example simplified network 100 of devices illustratively comprising various communicating and non-communicating devices. For example, power-lines 160 may bring electrical grid power from respective transformers 170 into homes/businesses/etc., generally via a meter 150. In addition, "pole-top" routers 120 may communicate data packets 140 (e.g., traffic and/or messages) with other communicating nodes/devices of the network 100. For instance, the links between the devices may be wired links (e.g., for power-line communication) or may comprise a wireless communication medium. A home energy controller (HEC) 110 or other energy controller may be present at certain locations, and may be in communication with the meters 150, pole-top routers 120, or else directly to another computer network, e.g., WAN 130, similar to conventional computers 105. In addition, a centralized control center or management center 190 may be present in the network 100, such as at an electrical grid company's centralized location, and may be in communication over power-lines 160 and through WAN 130.

Those skilled in the art will understand that any number of nodes, devices, links, etc., as well as any different (and suitable) type of nodes, devices, links, etc., may be present in the network, and that the view shown herein is for simplicity and is not meant to limit the scope of the embodiments herein. In fact, those skilled in the art will appreciate that countless arrangements of power grid components and communicating devices may be established.

Shared-media mesh networks, such as network 100, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built based on an Objective Function (OF). The role of the Objective Function is generally to specify rules on how to build the DAG (e.g. number of parents, backup parents, etc.).

Figure 2:
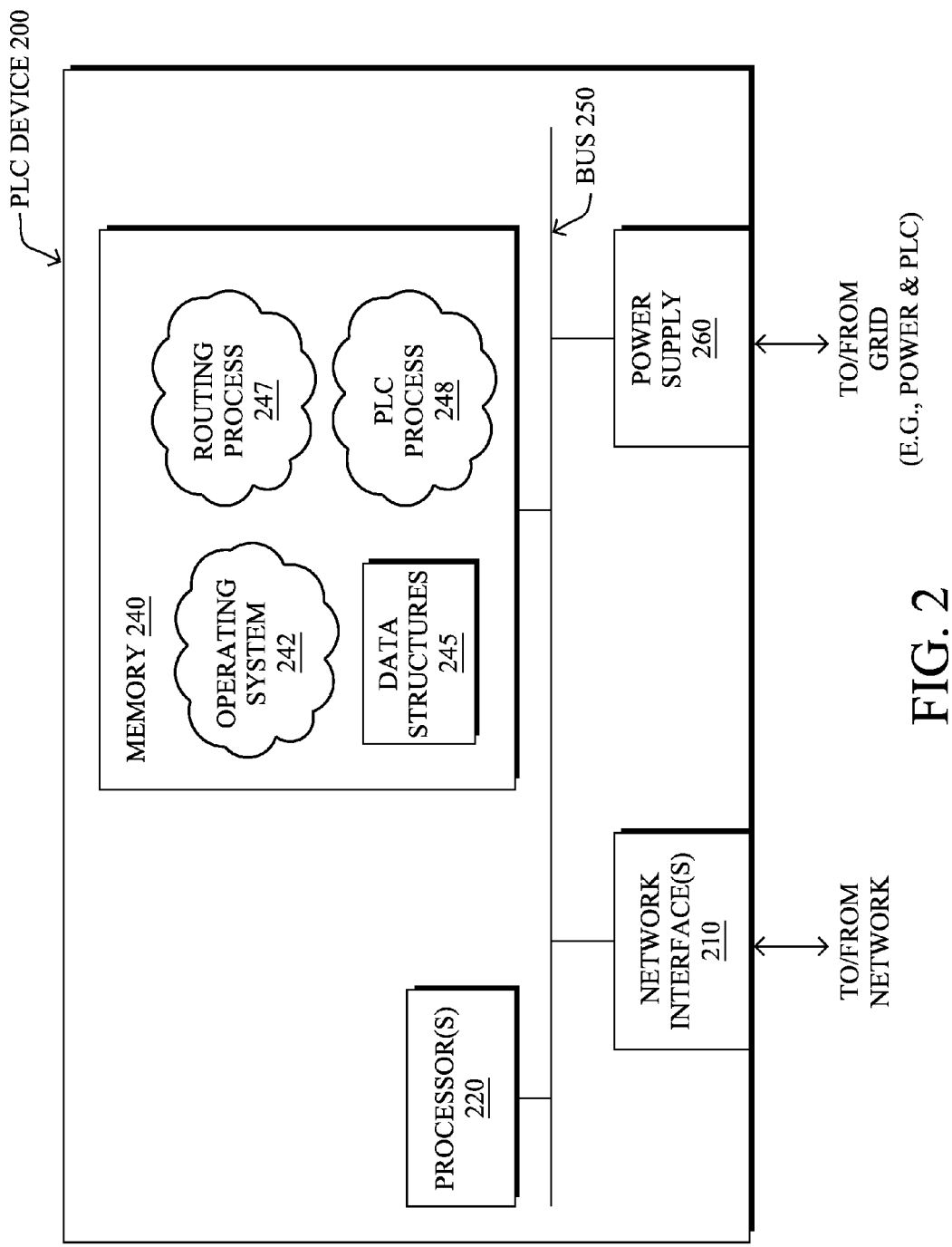
FIG. 2 illustrates an example device/node.

FIG. 2 is a schematic block diagram of an example device 200 that may be used with one or more embodiments described herein. For example, PLC device 200 may correspond to a router 120 or smart meter 150 shown in FIG. 1, or another such device configured to communicate with such devices in network 100. The device 200 may comprise, as a simple representation, a network interface 210, a processor 220, and a memory 240 interconnected by a system bus 250. Notably, device 200 may also be powered by a power supply 260, such as a battery, a "plug-in" power supply, and/or a power supply that receives electric power from a power grid. For example, if device 200 is a pole-top router, device 200 may be powered directly by the power lines supported by the pole.

The network interface 210 contains the mechanical, electrical, and signaling circuitry for communicating data over physical and/or wireless links coupled to the network 100. The network interface may be configured to transmit and/or receive data using a variety of different communication protocols, including, inter alia, various wired or wireless protocols, powerline communication (PLC) protocols, broadband over power lines (BPL), etc. In cases in which device 200 is connected to multiple electrical phases in the power grid, network interface 210 may be configured to communicate over any or all of the connected phases using a PLC protocol. In one embodiment, network interface 210 comprises a single front-end that is multiplexed across the different electrical phases. In another embodiment, network interface 210 comprises separate front-end modules for each connected electrical phase.

The memory 240 comprises a plurality of storage locations that are addressable by the processor 220 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. As shown, for example, operating system 242 may invoke a PLC process 248 to handle the reception and/or transmission of PLC messages from other devices on the network, if device 200 is so equipped. In some embodiments, a routing process 247 may be invoked by operating system 242 to implement one or more routing protocols within the network. Note that although the processes 247, 248 are shown within central memory 240, certain embodiments provide for processes 247, 248 to be a part of the network interfaces 210, and the embodiment shown is not meant to limit the techniques herein.

Routing process 247 includes computer executable instructions executed by processor 220 to perform functions provided by one or more routing protocols, such as proactive or reactive routing protocols, as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 247 may consist solely of providing mechanisms necessary for source routing techniques. That is, for source routing, other devices in the network can tell the less capable devices exactly where to send the packets, and the less capable devices simply forward the packets as directed.

As noted above, electric power is generally transmitted from generation plants to end users (industries, commercial, residential, etc.) via a transmission grid consisting of a network of power stations, transmission circuits, and substations interconnected by power lines. From the transmission grid, power may then be distributed to end users via a distribution system. Once at the end users, electricity can be used to power any number of devices, such as end-point devices. The transmission and distribution of alternating-current (AC) electric power to the end users most frequently takes the form of poly-phase electric power, a common form of which being three-phase electric power. For smaller customers (e.g., households) usually a single phase is taken to the property. For larger is installations (large houses, buildings), all three phases may be taken to a distribution panel, from which both single and multi (two or three-phase) circuits may be fed.

Figure 3:
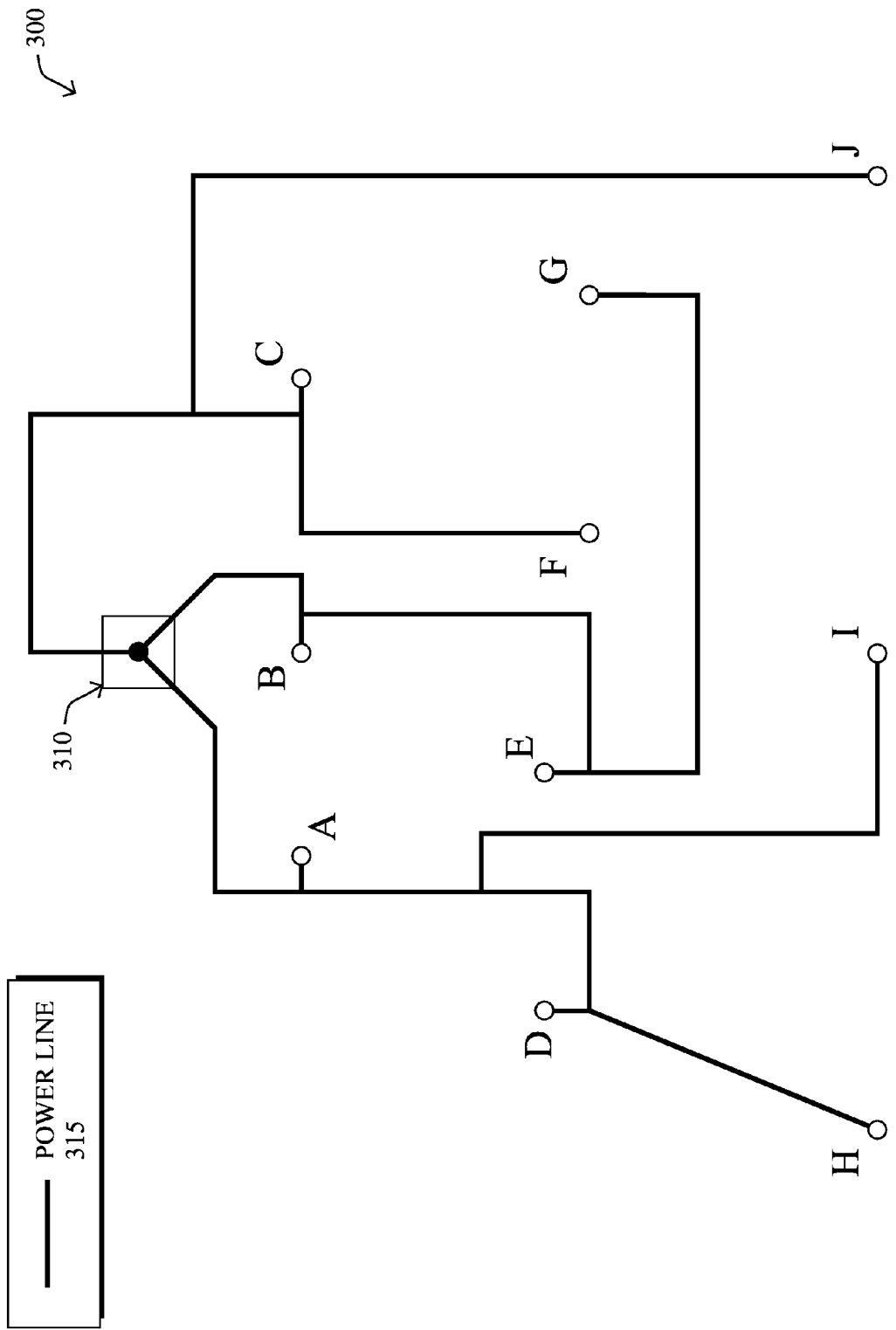
FIG. 3 illustrates an example electric power distribution system.

FIG. 3 illustrates a vastly simplified view of an example electric power transmission and distribution grid 300 to the example devices of FIG. 1, above. For instance, a distribution center 310 supplies electricity over a plurality of power lines 315 (e.g., power-lines 160) to the devices at locations "A" through "J".

Figure 4:
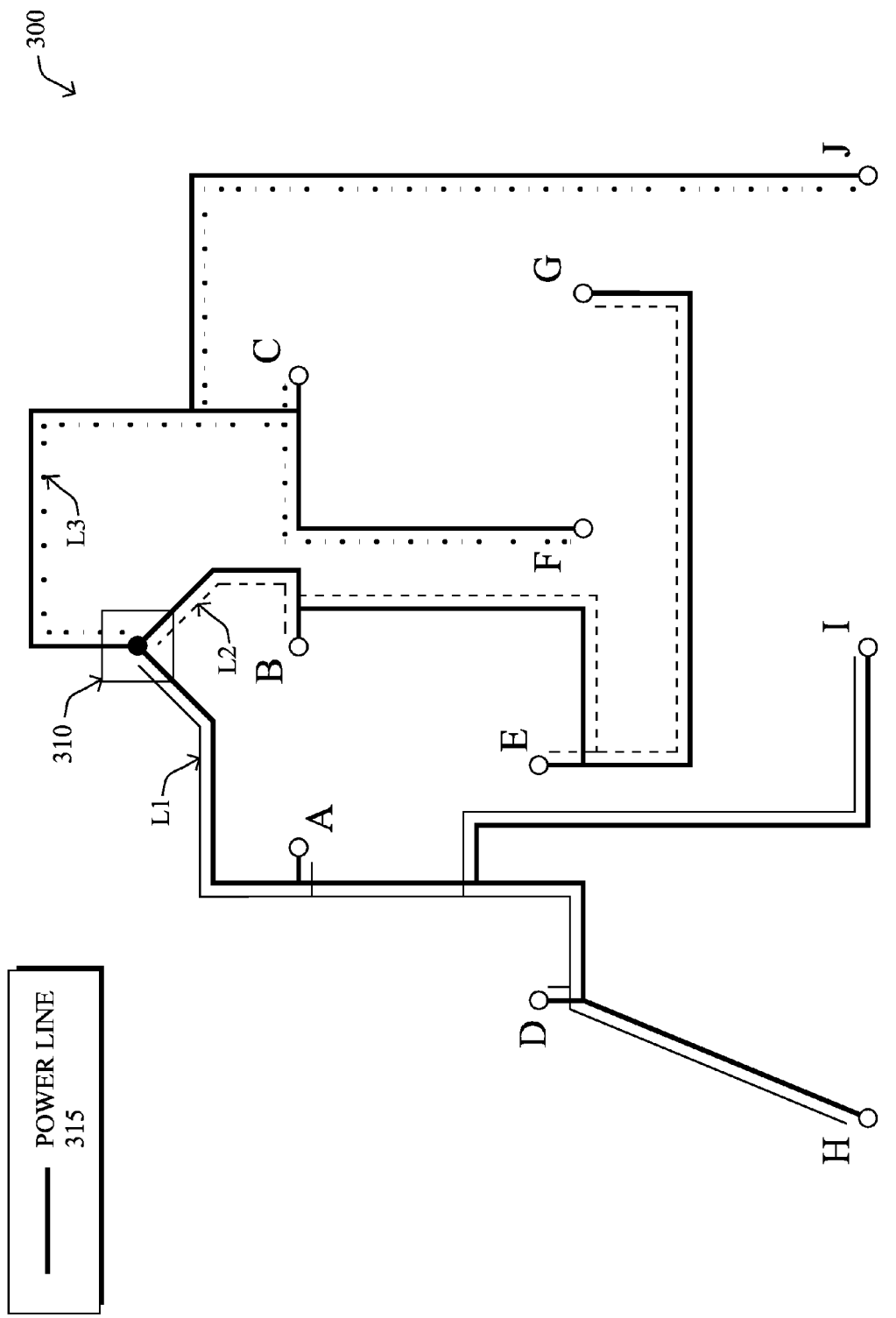
FIG. 4 illustrates an example poly-phase electric power distribution of the system shown in FIG. 3.

In the embodiments herein, the supplied electricity is part of a poly-phase source system, where a plurality of phases (e.g., three) are transmitted onto the lines 315 to the devices, such that each device is generally attached to a particular phase of the electric grid. As shown in FIG. 4, therefore, electrical power of three phases, L1, L2, and L3, is supplied to the locations A-J (a neutral/ground may be shared by the phases). Notably, as mentioned above, the view shown herein is vastly simplified, as each phase may generally be used to power entire buildings, neighborhoods, etc., and may also supply power to many (e.g., tens, hundreds, thousands) of devices within those establishments. Also, while the view shown herein is generally arbitrarily connected, phase-based distribution grid topologies generally result in "clusters" of like-phased devices (e.g., those within the buildings, neighborhoods, etc.).

Figure 5B:
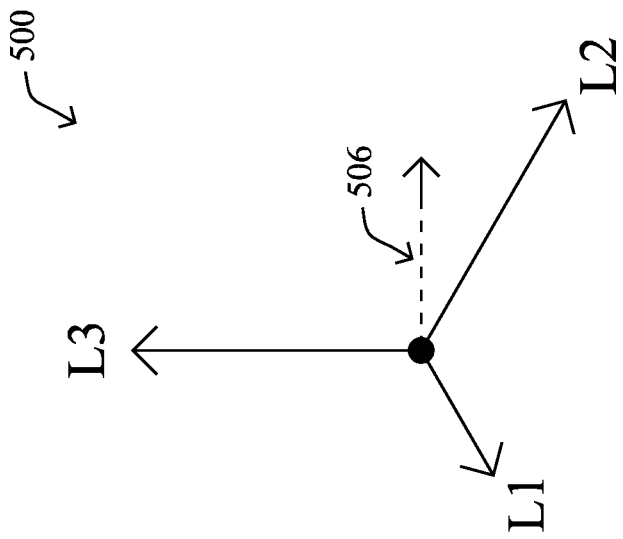
FIGS. 5A-B illustrate example phase representations of the poly-phase electric power distribution system shown in FIGS. 3-4.
Figure 5A:
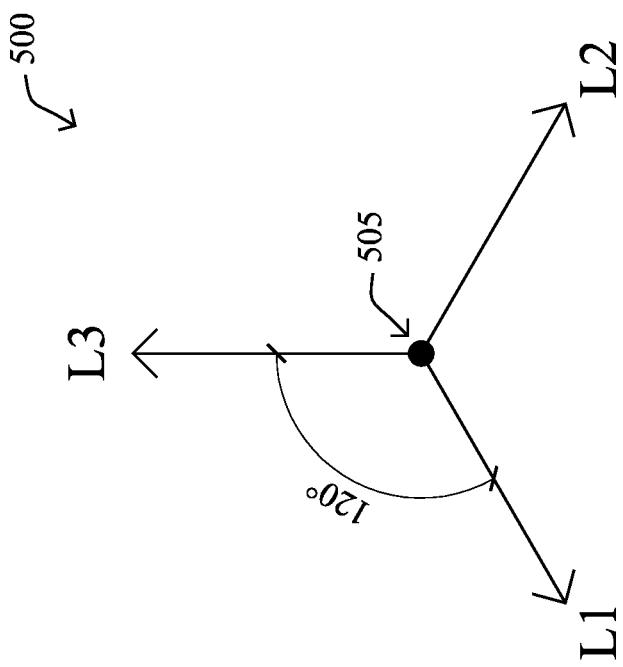

FIG. 5A illustrates an example phase representation 500 of the distribution grid's electrical power. In particular, three current waveforms are illustratively produced (L1, L2, and L3) that are generally equal in magnitude and 120° out of phase to each other. The currents returning from the end users to the supply transformer all share the neutral wire (neutral point 505). If the loads are evenly distributed on all three phases, as they are in FIG. 5A, the sum of the returning currents in the neutral wire is approximately zero. Any unbalanced phase loading such as in FIG. 5B, however, may result in a current 506 at the neutral point, which may cause inefficient use of transformers, vibrations in generators, or other problems, including (but not limited to) brown-outs or black-outs in extreme cases. There are many factors that may create imbalance between the phases, such as excess load usage, downed power lines, etc.

Devices in a PLC network may communicate information, such as metering data, to other devices in the network over one or more electrical phases connected to a device. One link technology for smart grid AMI networks is defined in the IEEE 1901.2 PLC protocol. IEEE 1901.2 specifies an orthogonal frequency division multiplexing (OFDM) physical layer that increases overall throughput and robustness across a noisy and unpredictable medium. Using such a protocol, a device on the power grid (e.g., a field area router or the like) that is connected to any or all of the electric power phases may communicate with other devices in the power grid via the phases connected to the device.

Figure 6A:
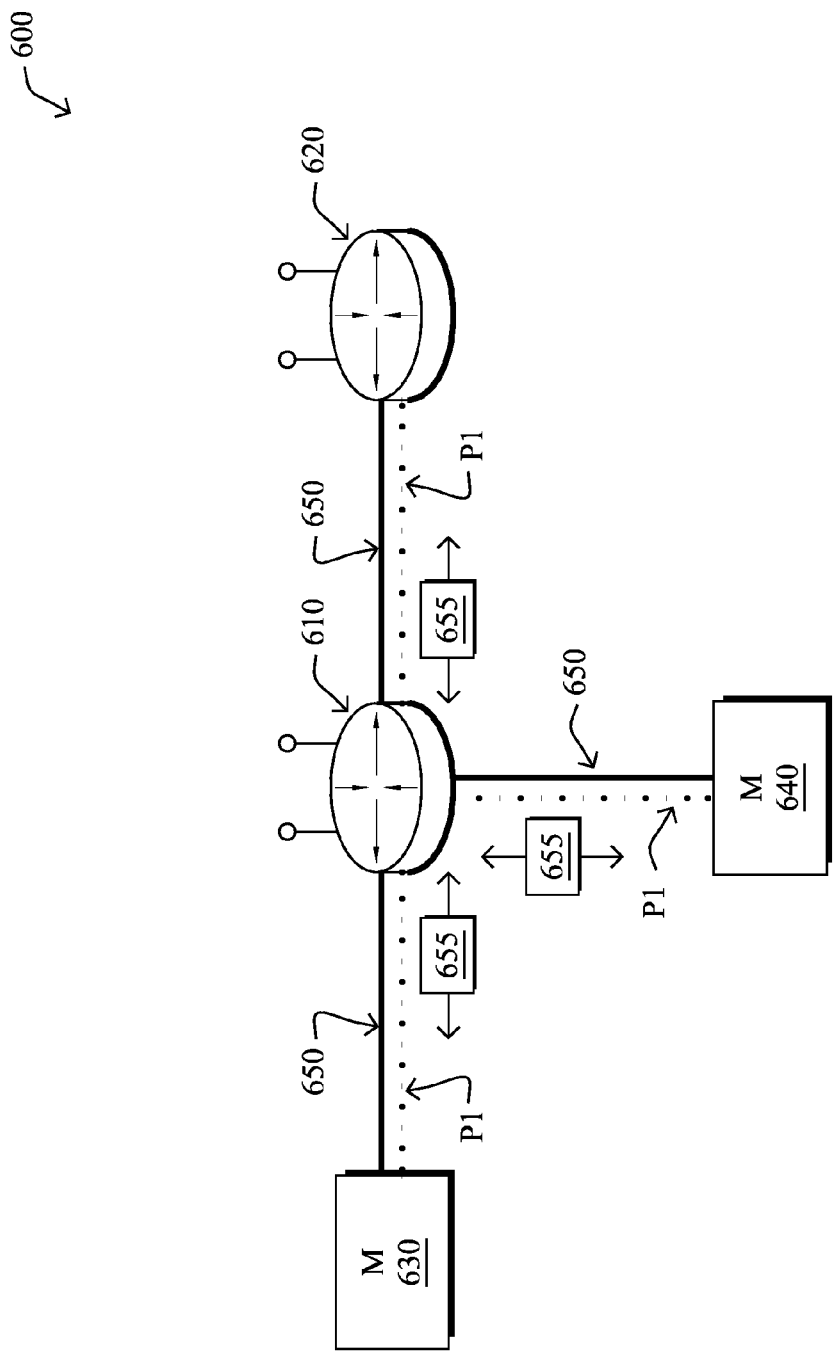
FIGS. 6A-6C illustrate a simplified example of messages being sent on different electrical phases.
Figure 6B:
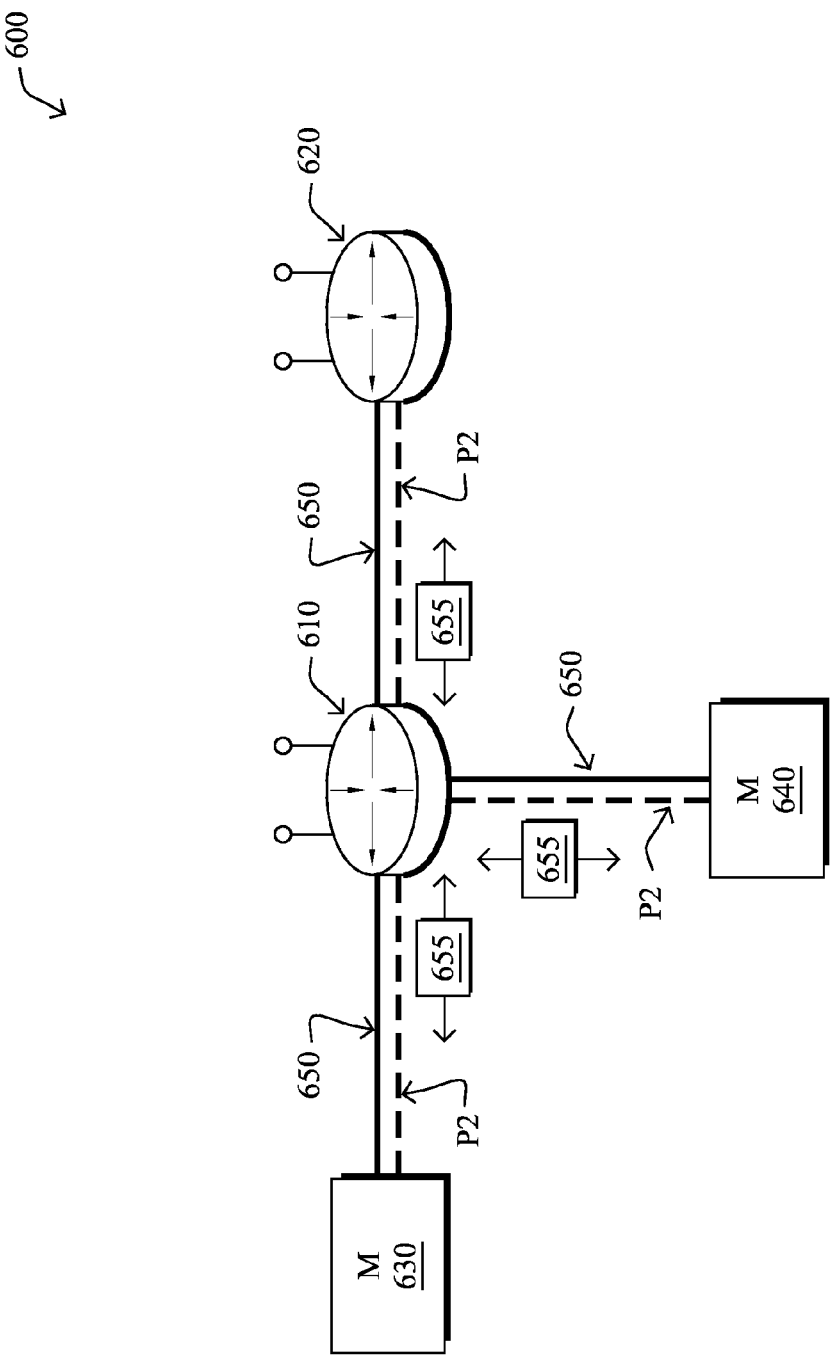
Figure 6C:
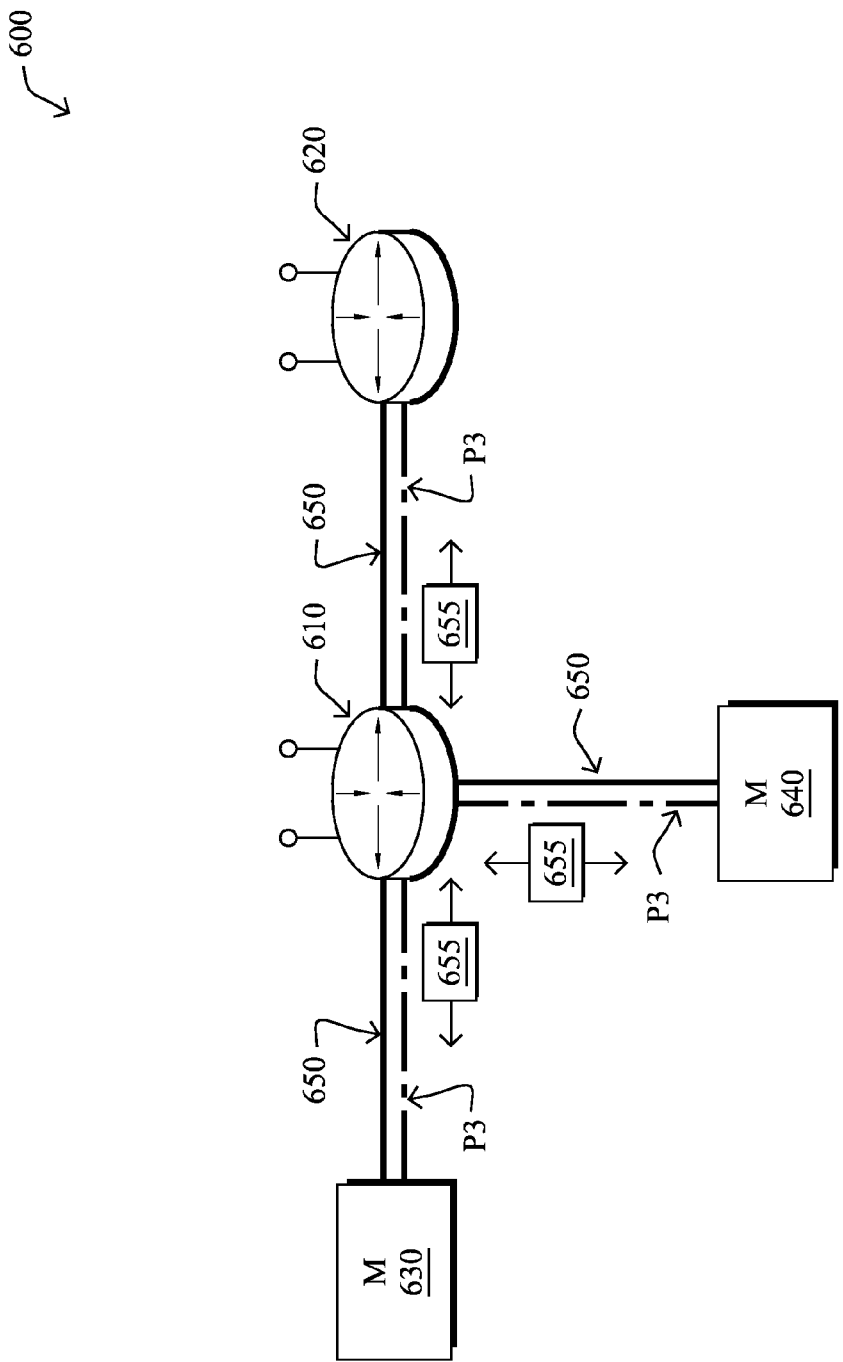

FIGS. 6A-6C illustrate a simplified example of messages being sent on different electrical phases. As shown in FIG. 6A, network devices 600 may exchange messages 655 on a particular phase P1 of power delivered by the electric grid. For example, router 610 may receive and/or transmit messages 655 to or from any of smart meters 630, 640 and router 620 on phase P1 via physical links 650.

According to various embodiments, each of network devices 600 may comprise an interface that can dynamically transmit/receive on each connected phase individually. In other words, the interface allows the network device to switch between different electrical distribution phases or transmit/receive signals on multiple phases simultaneously. As illustrated in FIGS. 6B-6C, any or all of network devices 600 may transmit and/or receive messages 655 on electrical phases P2 and P3, in addition to that of phase P1. For example, messages 655 may be communicated between network devices 600 on any or all of phases P1-P3. As would be appreciated, the configurations of devices 600 are illustrative only and that a particular device may be connected to any number of electrical phases (e.g., one phase, two phases, etc.).

Cross-talk effects may be present in a PLC network, leading to a message being sent on one electrical phase and propagating onto one or more other phases. For example, metering device 630 may send a particular communication to router 610 via phase P1 that propagates onto phase P2 and/or phase P3 due to the presence of crosstalk effects. Thus, while a network device may be able to communicate simultaneously on different communication channels on a shared medium (i.e., on different electrical phases in a PLC network), crosstalk effect may cause messages sent on different phases to interfere with one another.

Identifying Distinct Communication Links Using Crosstalk Measurements

Figure 7A:
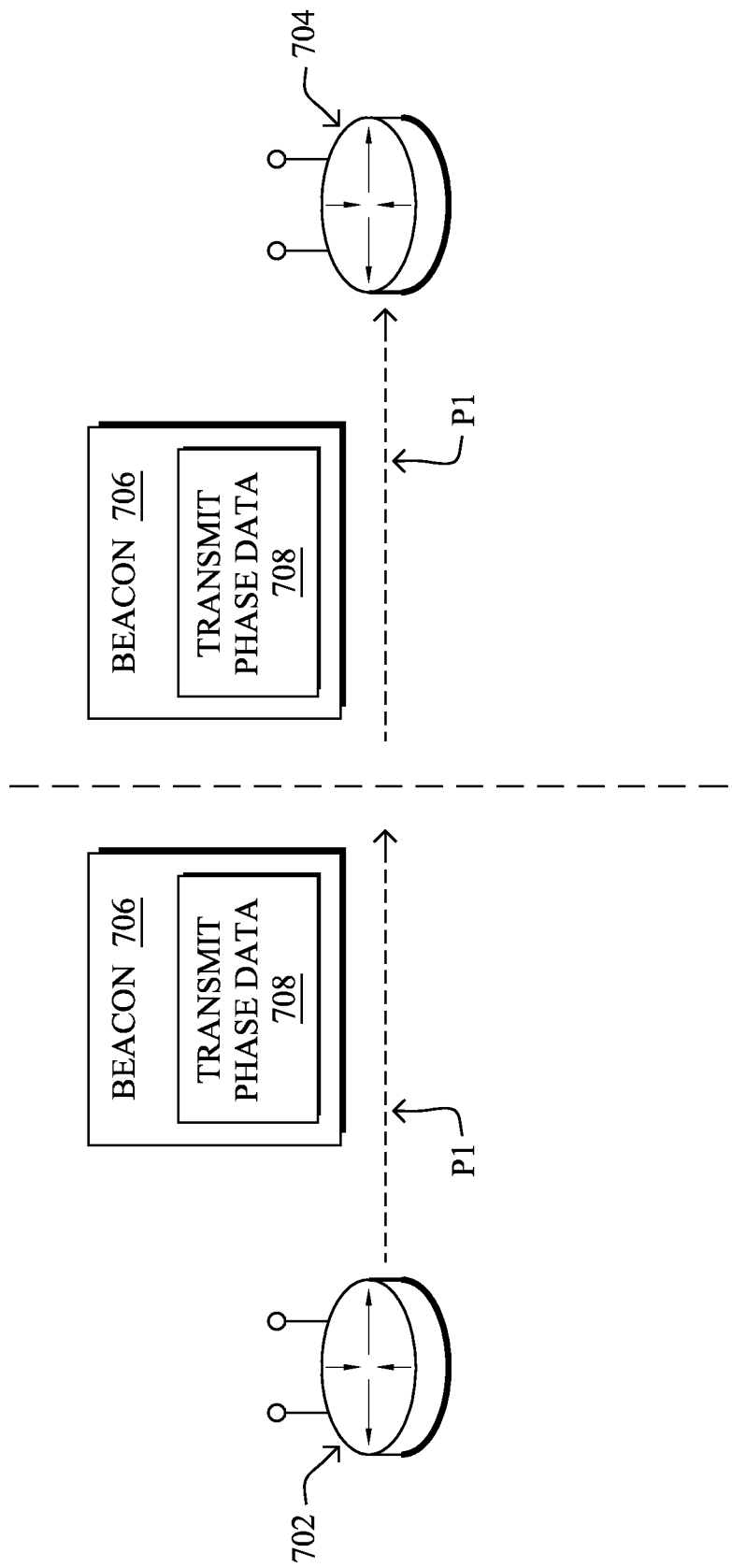
FIGS. 7A-7D illustrate a simplified example of a device/node identifying communication channels.
Figure 7B:
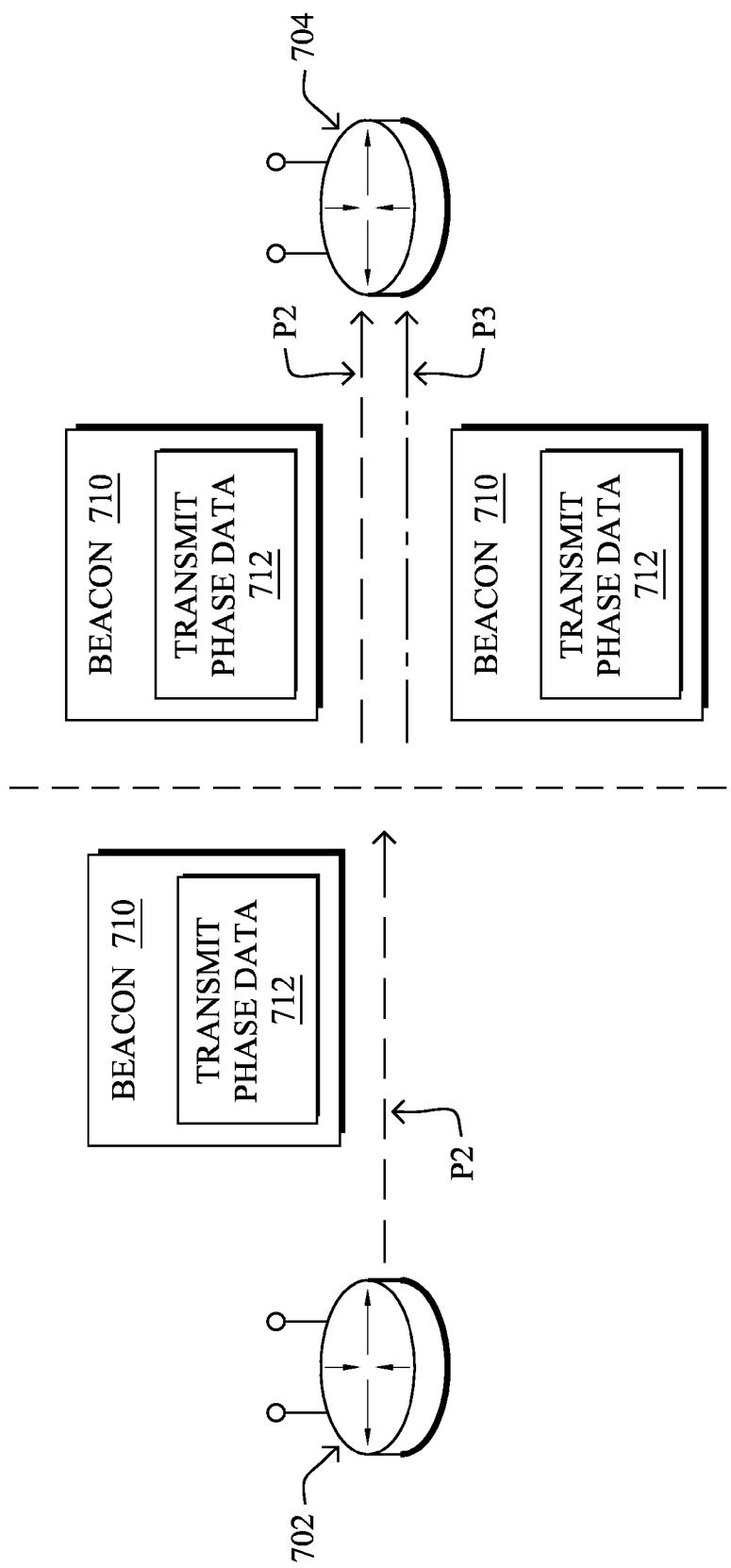
Figure 7C:
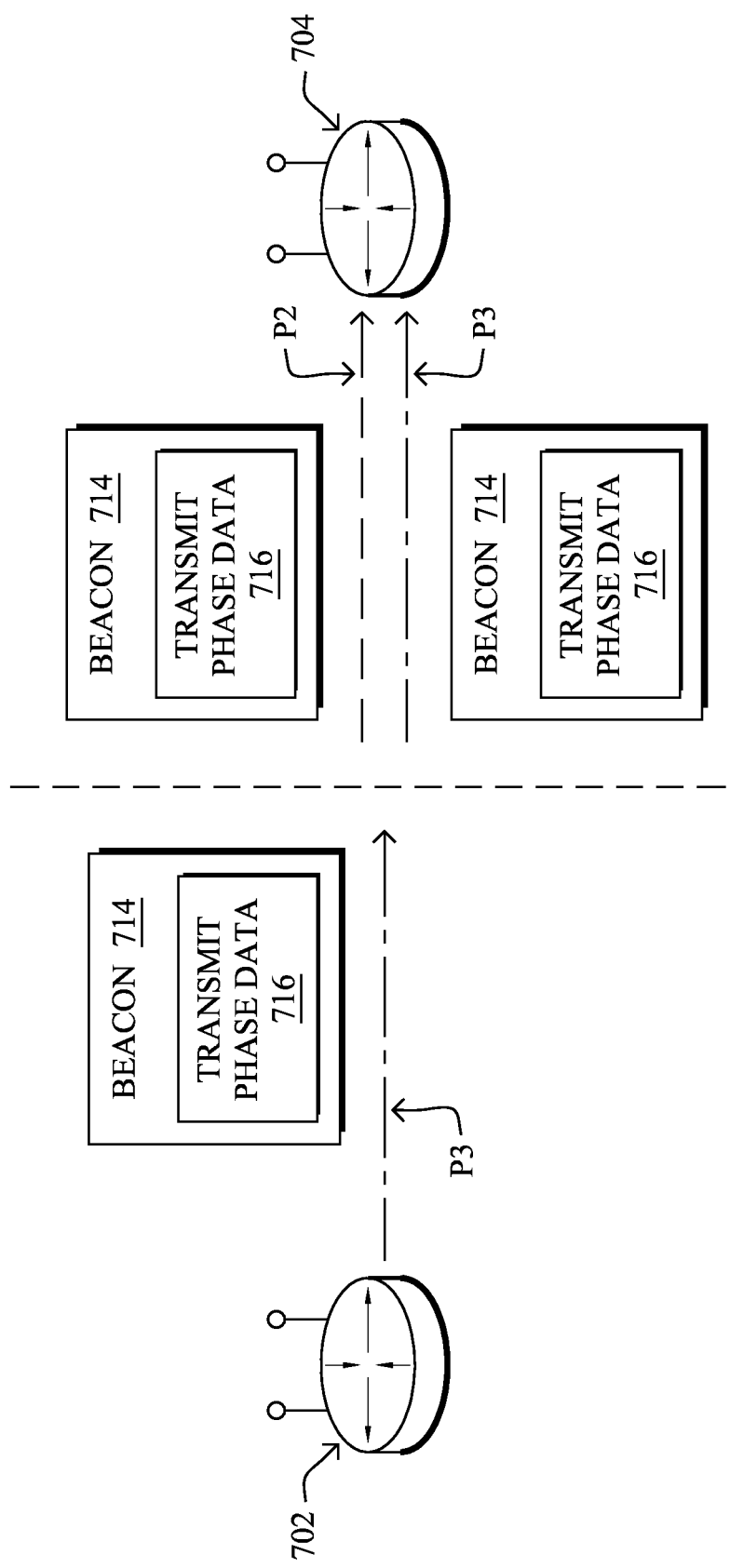

FIGS. 7A-7D illustrate a simplified example of a device identifying available communication channels with a neighboring device. As shown in FIGS. 7A-7C, neighboring device 702 may transmit beacons 706, 710, and 714 to device 704, such as part of a device discovery function (e.g., an IEEE 802.15.4e-2012 Enhanced Beacon message). Contained within each of beacons 706, 710, and 714 are phase data 708, 712, and 716, respectively, which indicate the electrical phase on which device 702 sent the corresponding beacon. For example, phase data 708 may indicate that beacon 706 was transmitted on phase P1, phase data 712 may indicate that beacon 710 was transmitted on phase P2, and phase data 716 may indicate that beacon 714 was transmitted on phase P3.

In response to receiving a beacon message containing phase data, device 704 may use the data associated with the beacon to identify whether a crosstalk condition exists. For example, device 704 may use phase data and link metrics such as such as signal strength indication (RSSI) data, link quality indication (LQI) data, etc., to identify whether a crosstalk condition exists. In another embodiment, device 704 may attempt to recover these metrics based on a beacon message received on a single electric phase (e.g., by maintaining a history of RSSI measurements, computing bit-errors for the demodulated signal on other phases, etc.). For example, as shown in FIGS. 7B-7C, device 704 may determine that a crosstalk condition exists between phases P2 and P3.

Figure 7D:
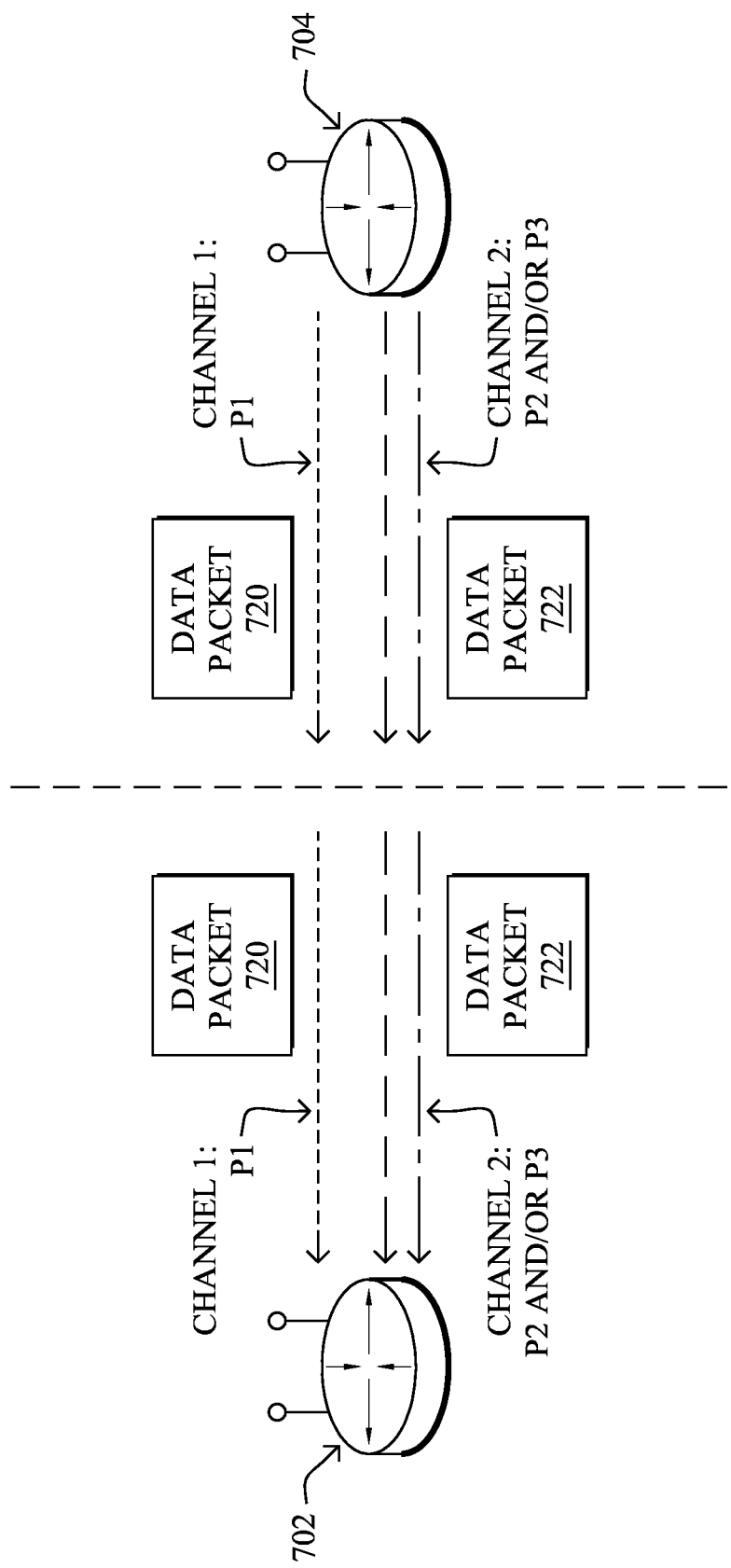

In some embodiments, a device may use phase and crosstalk data to identify how many distinct communication channels exist between the device and a neighboring device. For example, as shown in FIG. 7D, device 704 may determine that phase P1 is a distinct communication channel with device 702 because it does not experience crosstalk with another phase. Device 704 may also determine, based on the crosstalk data, that phase P2 or phase P3 is a second communication channel because no crosstalk exists between these phases and phase P1.

Figure 8:
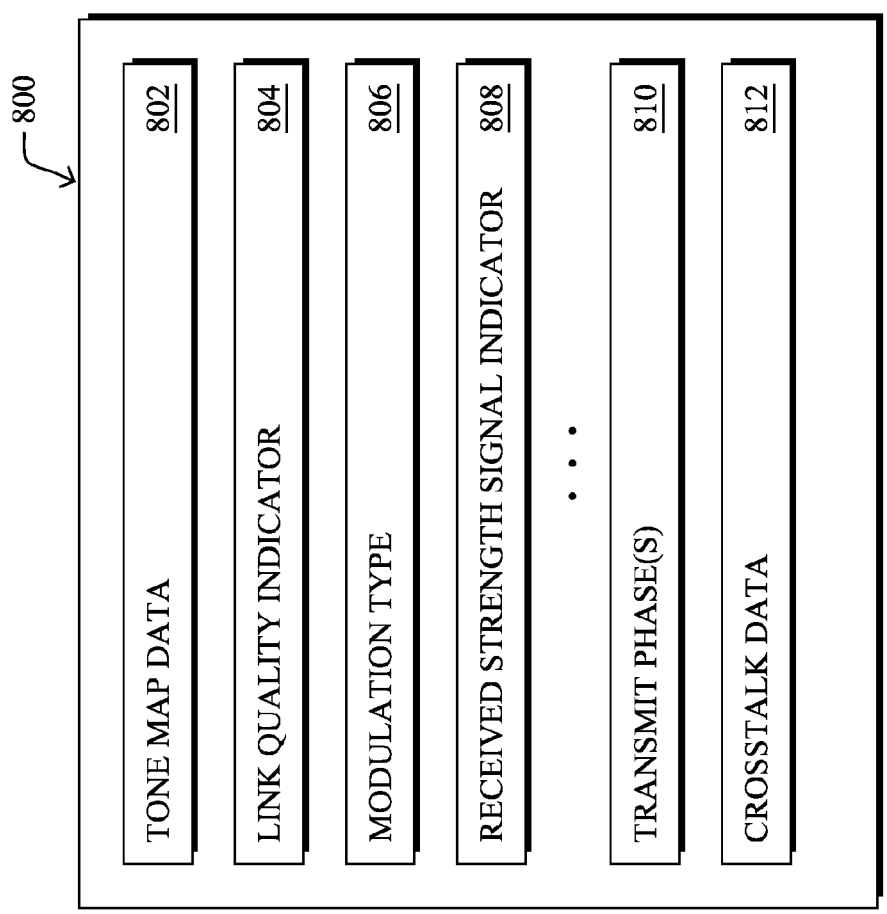
FIG. 8 illustrates an example tone map response that includes cross-talk data.

According to various embodiments, crosstalk and phase data may be utilized within a tone mapping mechanism between devices in the network. One such mechanism is specified in IEEE P1901.2, which defines a Tone Map Request (TMREQ) and Tone Map Response (TMREP) exchange to allow a device to determine what transmission parameters (i.e., tone mask, modulation, transmit power, etc.) to use when transmitting to a neighbor. In one embodiment, a TMREP message may be modified to include phase data (e.g., on which phase(s) the response was sent) and/or crosstalk information (e.g., the degree of crosstalk between phases that was identified by the sending device). For example, as shown in FIG. 8, a TMREP message 800 may include various data, such as tone map data 802, LQI data 804, modulation type data 806, RSSI data 808, or any other data that may be included in a TMREP message. TMREP message 800 may further include transmit phase data 810 that denotes on which phase or phases TMREP message 800 was sent. TMREP message 800 may also include crosstalk data 812 that denotes on which phases, if any, crosstalk was identified. In one embodiment, crosstalk data 812 may include a list of which phases experience crosstalk and should not be used for simultaneous transmission. In another embodiment, crosstalk data 812 may indicate the degree of crosstalk between one phase and another (i.e., in terms of attenuation, signal strength, etc.).

Figure 9A:
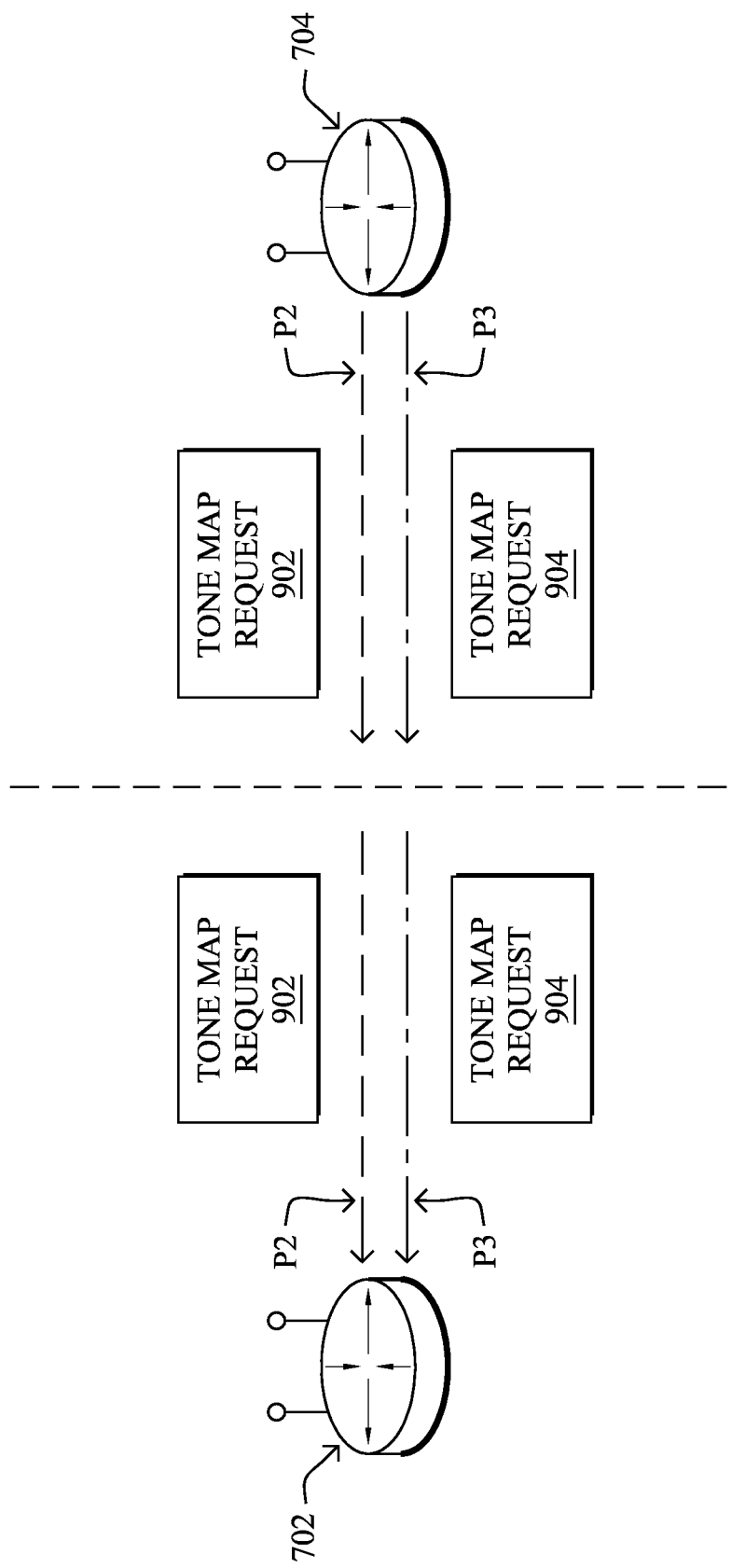
FIGS. 9A-9B illustrate a simplified example of a device validating a communication channel.
Figure 9B:
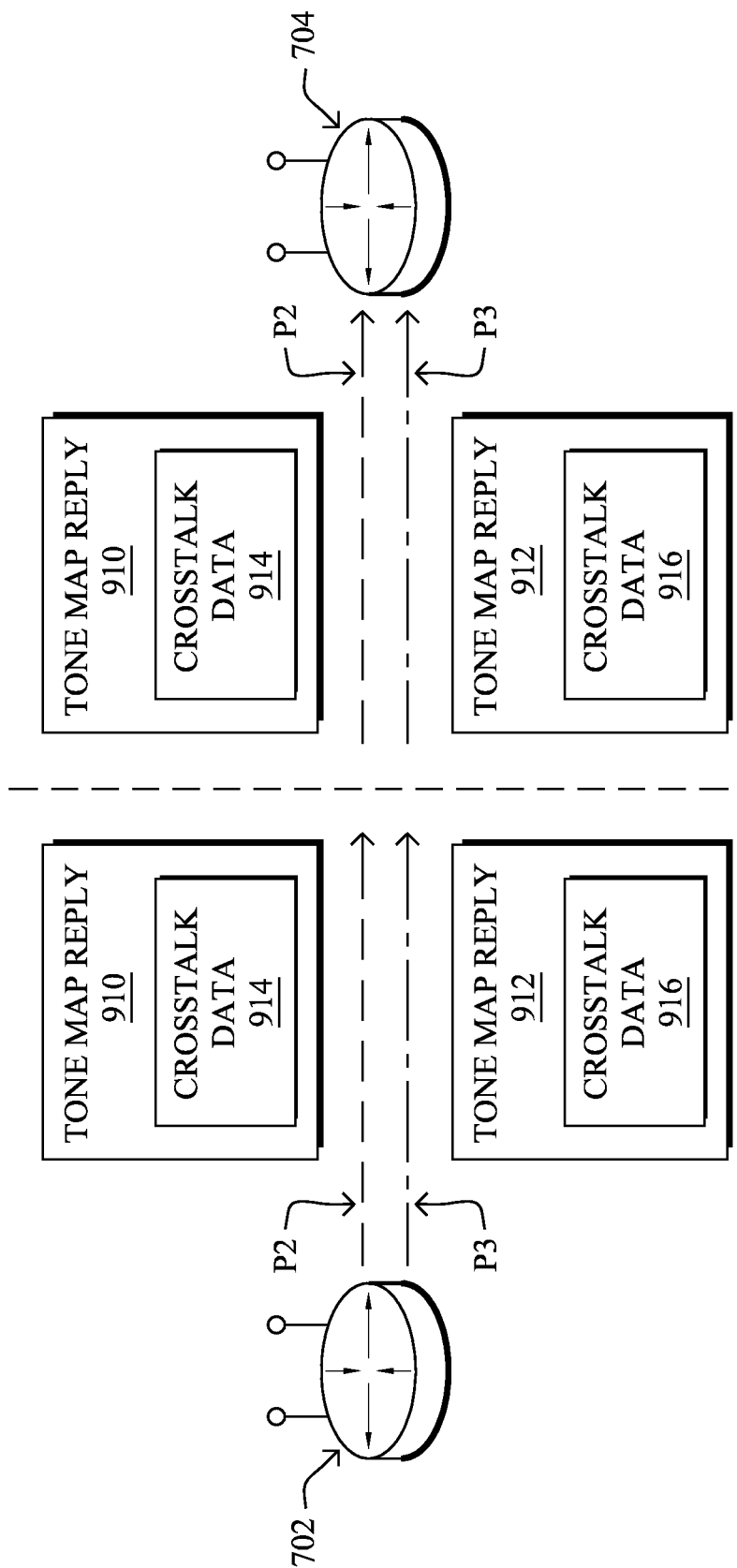

In some embodiments, TMREQ and TMREP exchanges between devices may be used to test simultaneous transmissions. As shown in FIGS. 9A-9B, for example, a TMREQ and TMREP exchange may be conducted between devices 702, 704, to test whether the devices can communicate simultaneously on different phases, such as phases P2 and P3. In some cases, physical layer observations (e.g., RSSI, LQI, etc.) may not be sufficient to determine if crosstalk prevents simultaneous transmissions. In such a case, a device may utilize the TMREQ and TMREP exchange to probe the link. In particular, two distinct TMREQ messages may be sent on the different electric phases. For example, assume for purposes of illustration that devices 702, 704 are both connected to phases P2 and P3 and that device 704 needs to probe whether these phases can be used as distinct communication channels. In such a case, device 704 may send distinct TMREQ messages 902, 904 to neighboring device 702 on phases P2 and P3, respectively. Of note is that when sending the same TMREQ message, it is not possible to distinguish whether or not crosstalk exists.

In response to receiving TMREQ messages as part of a probe, the receiving device may determine whether or not it was able to receive the messages and on which phases. The neighbor may then respond with a TMREP message containing phase and crosstalk data from the TMREQ messages, to communicate the observations back to the probing device. For example, as shown in FIG. 9B, neighboring device 702 may respond to device 704 with a TMREP message 910 and/or TMREP message 912 having a format similar to that shown in FIG. 8. In other words, TMREP messages sent in reply to device 704 may include crosstalk data 914 or 916, respectively, that denotes any crosstalk or degree of crosstalk identified by neighboring device 702. In turn, device 704 may use the received crosstalk data to determine whether distinct communication channels exist between devices 702, 704 (e.g., on phases P2 and P3) or whether crosstalk effects limit the number of communication channels (e.g., only one phase may be used for communications).

As noted above, distinct communication channels between neighboring devices in a poly-phase network may be identified using crosstalk measurements. From a network perspective, the availability of multiple communication channels between devices may also be used to affect routing decisions. In other words, routing paths in the network may differ depending on the number of communication channels that are available between the devices (i.e., electrical phases that do not exhibit crosstalk).

Determining Routing Paths Using Available Communication Channels

The techniques herein provide methodologies that allow poly-phase PLC links to be utilized at the network layer. In one aspect, a new routing metric and mechanism is introduced for exposing the number of distinct communication channels offered by a poly-phase PLC link. The number of distinct communication channels may be reported to a path computation engine (PCE), such as the root node of a DODAG, for use when computing routing paths. In further aspects, information regarding any measured crosstalk in the network may be reported to the PCE, possibly with historical information as well. Using the received information, the PCE can form source routes that take into account the number of distinct channels offered by each link along a path. In some cases, the PCE can also form multiple disjoint source routes to support simultaneous packet delivery with minimal self-interference.

Specifically, according to one or more embodiments of the disclosure as described in detail below, a node in a network receives communication channel data regarding one or more communication channels available between a particular device in the network and a neighboring device. Each communication channel corresponds to one or more electrical phases over which the particular device can communicate with the neighboring device. The node also receives crosstalk data regarding an amount of crosstalk between the electrical phases over which the particular device can communicate with the neighboring device. The node then generates a routing path for the network based on the received crosstalk and communication channel data.

Illustratively, the techniques described herein may be performed by hardware, software, and/or firmware, such as in accordance with the routing process 247, which may contain computer executable instructions executed by the processor 220 (or independent processor of interfaces 210) to perform functions relating to the techniques described herein, e.g., in conjunction with routing process 247. For example, the techniques herein may be treated as extensions to conventional protocols, such as the various PLC protocols or wireless communication protocols, and as such, may be processed by similar components understood in the art that execute those protocols, accordingly.

Operationally, the various devices in a PLC network may be configured to determine and report communication channel and/or crosstalk information to a PCE in the network. In other words, devices in the network may reports the number of distinct channel and crosstalk information to the network root, allowing the root to compute source routes that maximize the number of distinct channels and multiple disjoint source routes that minimize self-interference. In turn, the PCE may use this information when determining source routes to maximize the number of distinct channels and compute multiple disjoint source routes that minimize self-interference.

Figure 10A:
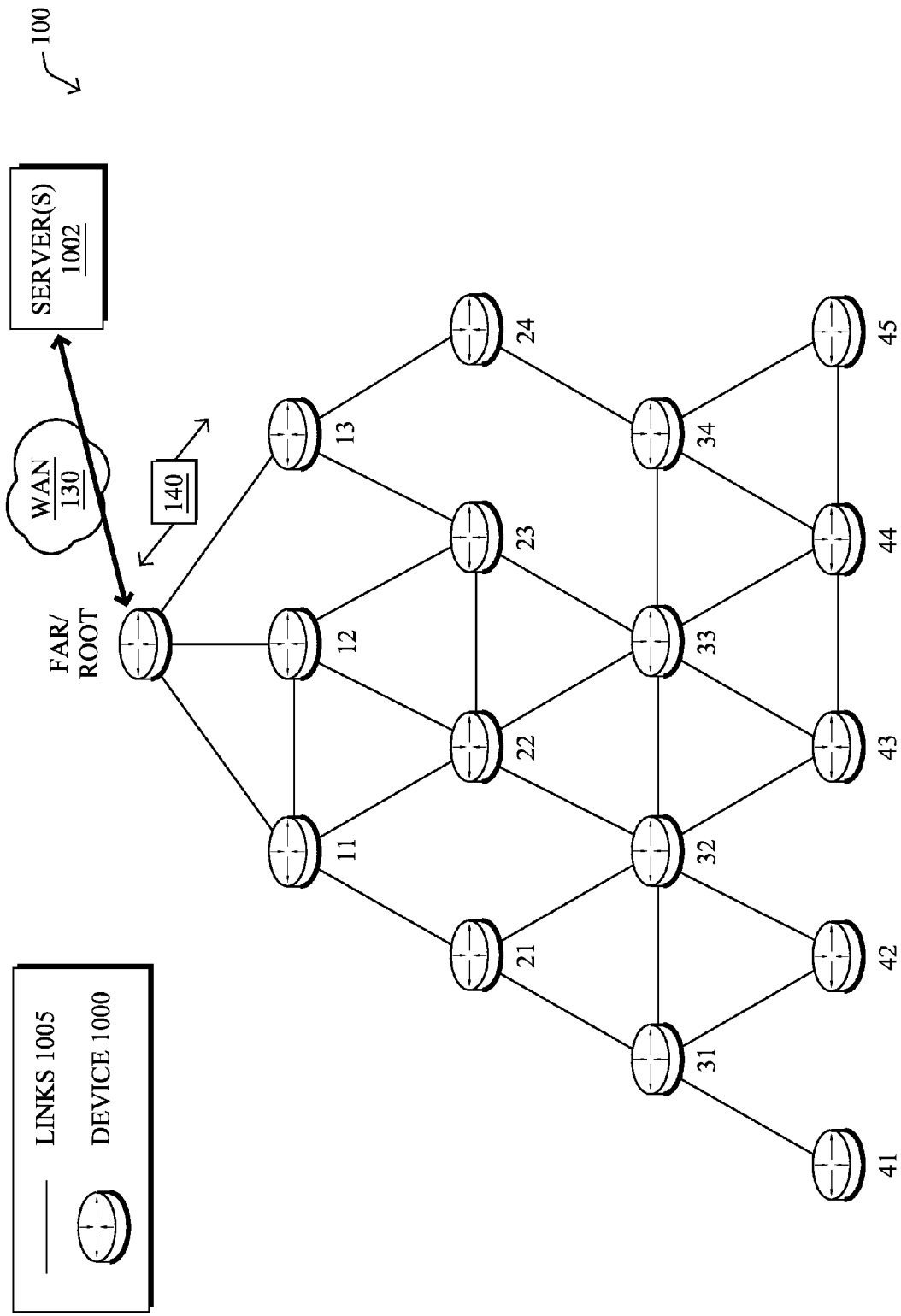
FIGS. 10A-10C illustrate a simplified example of routing paths being selected.
Figure 10B:
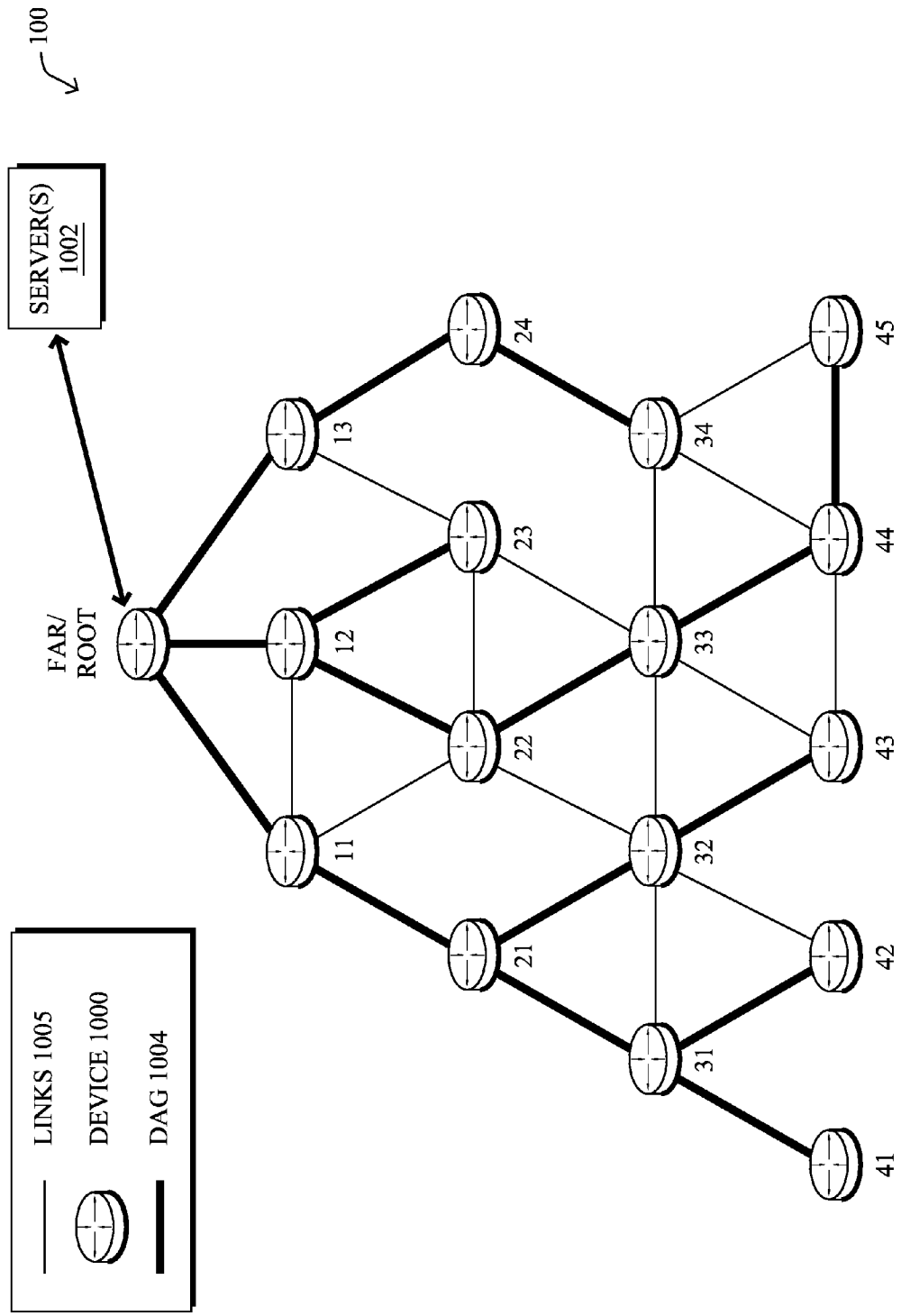
Figure 10C:
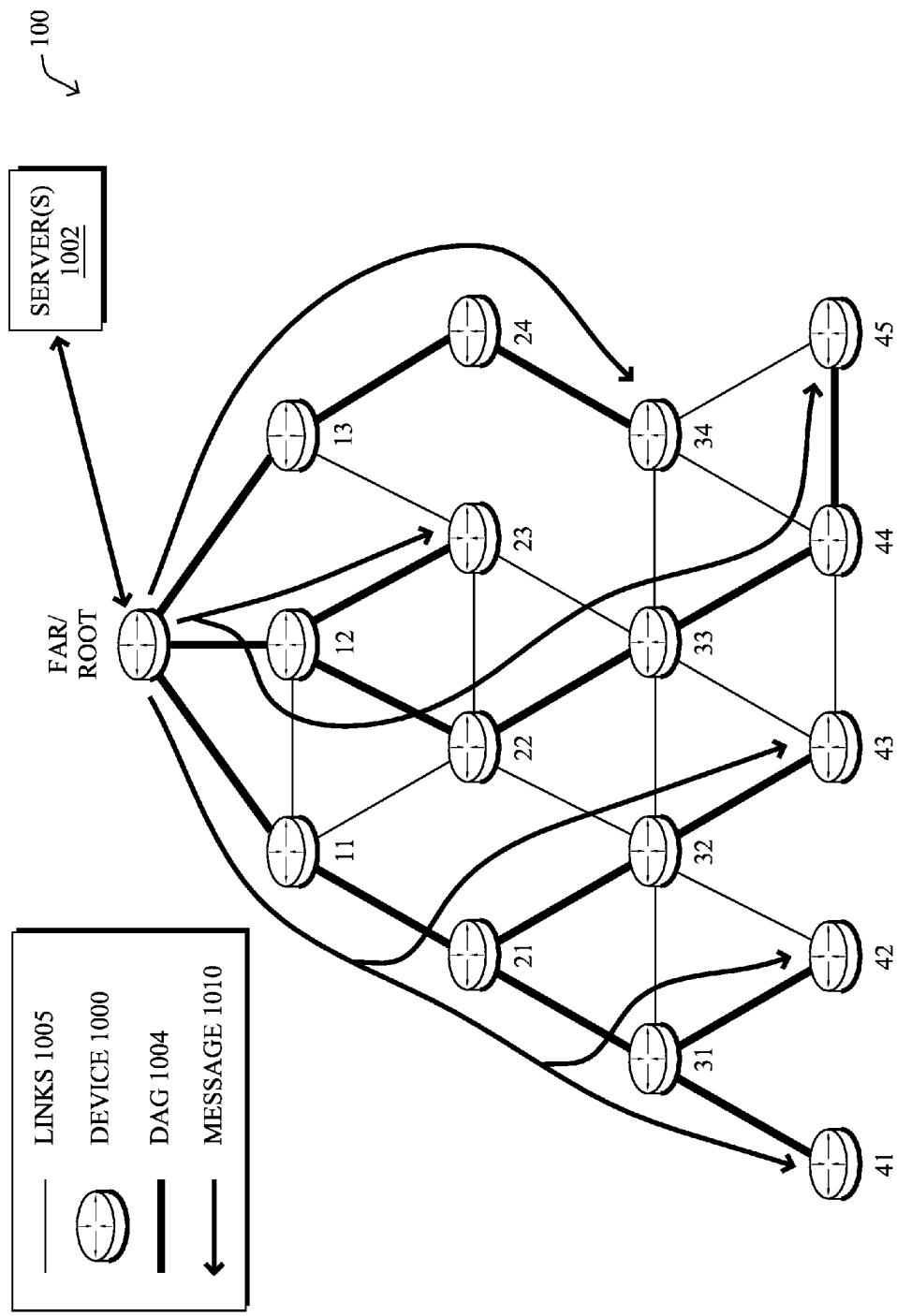

FIGS. 10A-10C illustrate a simplified example of routing paths being selected in a network, such as in network 100. As discussed previously, routing in an LLN may be accomplished by construction of a DAG. Building a DAG may utilize a discovery mechanism to build a logical representation of the network, and route dissemination to establish state within the network so that routers know how to forward packets toward their ultimate destination. According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. For example, as shown in FIG. 10A, a root node (e.g., a FAR or other device) may send a DIO message (e.g., messages 140) to the other devices 1000 in the network (e.g., routers, smart meters, etc.) via links 1005 (e.g., power lines 160, etc.). In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. As shown in FIG. 10A, such a message may be returned to the root node by the other devices 1000.

Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. An example DAG 1004 is illustrated in FIG. 10B. As illustrated in FIG. 10C, the root node may use DAG 1004 to route a message 1010 to any of the other devices 1000 in network 100.

According to some aspects of the techniques herein, a routing metric may be introduced that propagates information about the observed capabilities provided by the poly-phase PLC links. In particular, the new routing metric may indicates how many distinct channels exist along the poly-phase PLC links of the network. Note that this contrasts with non-LLN environments where multi-link is being used (e.g. MLPPP, use of bundles in optical networks, etc.) but where elements of the bundle are static and know a priori, which is not the case in LLN, thus requiring a different set of mechanisms and approaches.

Figure 11:
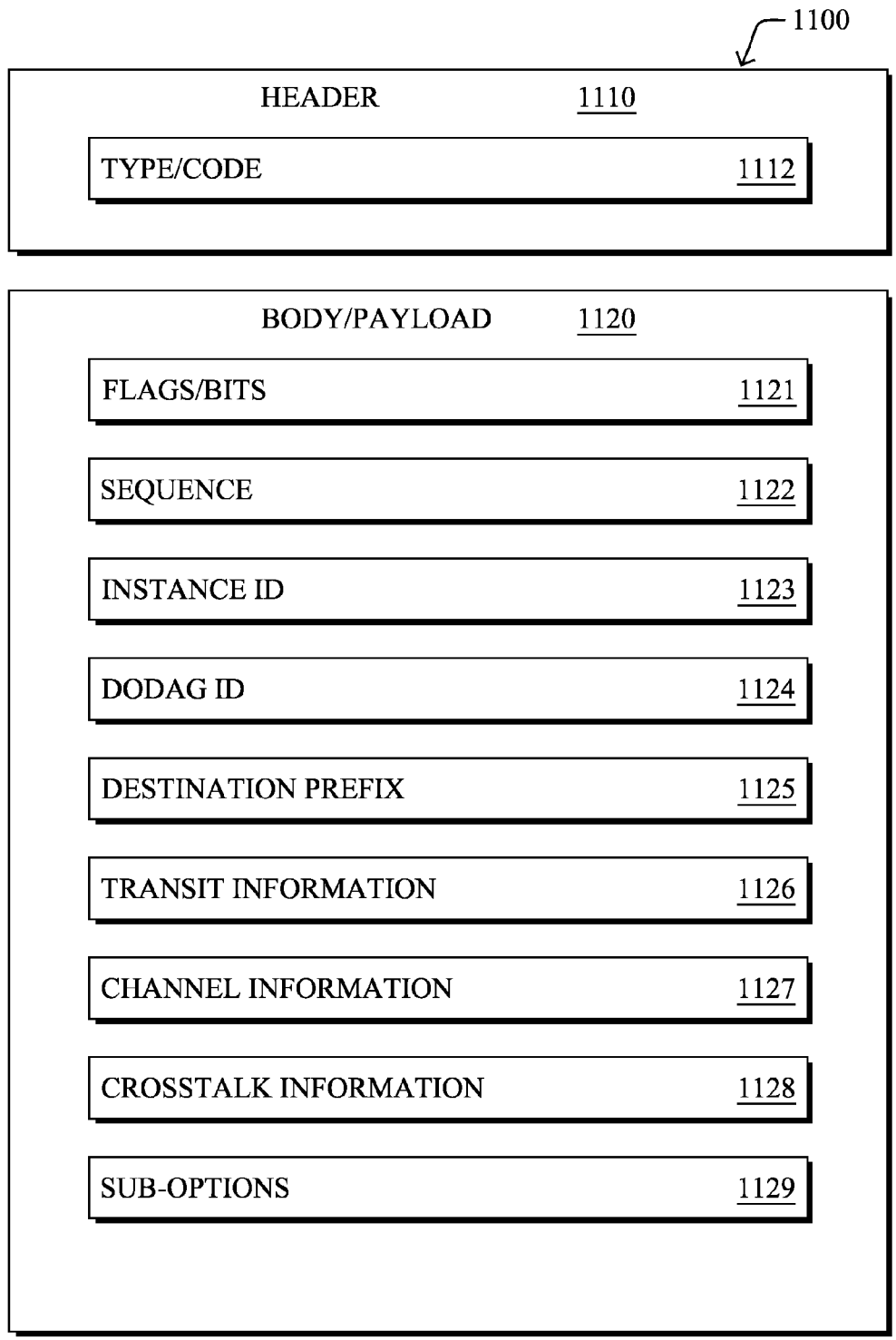
FIG. 11 illustrates an example destination advertisement object (DAO) message.

FIG. 11 illustrates an example format for a message 1100 that may be used for discovery and route dissemination when building a DAG, e.g., as a DAO message. Message 1100 illustratively comprises a header 1110 with one or more fields 1112 that identify the type of message (e.g., a RPL control message), and a specific code indicating the specific type of message (e.g., as a DAO message). Within the body/payload 1120 of the message may be a plurality of fields used to relay the pertinent information. In particular, the fields may comprise various flags/bits 1121, a sequence number 1122, an instance ID 1123, a DODAG ID 1124, destination prefixes 1125, and/or a transit information field 1126, among others (e.g., DAO_Sequence used for ACKs, etc.). One or more additional sub-option fields 1129 may also be used to supply additional or custom information within message 1100.

In various embodiments, message 1100 comprises channel information 1127 regarding the available communication channels (e.g., electrical phases that may be used for communication) between neighboring devices. Such information may be determined by each device, as described above, and included in a message passed back to the root of the network. In one embodiment, channel information 1127 indicates the minimum number of distinct channels a given link supports (aka the weakest-link metric). In another embodiment, channel information 1127 may include various counts. For example, channel information 1127 may include the number of single-channel, dual-channel, and triple-channel links effectively providing a distribution of links along a path. While it is possible to represent the number of distinct channels in a more generic metric (e.g., ETX, latency, throughput, etc.), exposing the number of distinct channels provides additional information about other qualities of the path (e.g., link diversity, enables 1+1, etc.).

According to various embodiments, message 1100 may include crosstalk information 1128. In one embodiment, crosstalk information 1128 may list the one or two other electric phases that are affected when a parent of a node transmits on a particular phase. Such a listing would add two bits of information to a phase report. Up to three reports may be included in the DAO (e.g., one report per phase). In another embodiment, crosstalk information 1128 indicates the degree of crosstalk when a parent of a node transmits on a particular phase. Doing so adds two bytes of information to the phase report. This information is not only useful for understanding and diagnosing the PLC network, the PCE may also use this information for computing routes. Furthermore historical data may optionally be provided, should the characteristics of links change over time, according to the local observations by remote nodes. This historical information may be used by the PCE when computing (diverse) path.

Figure 12A:
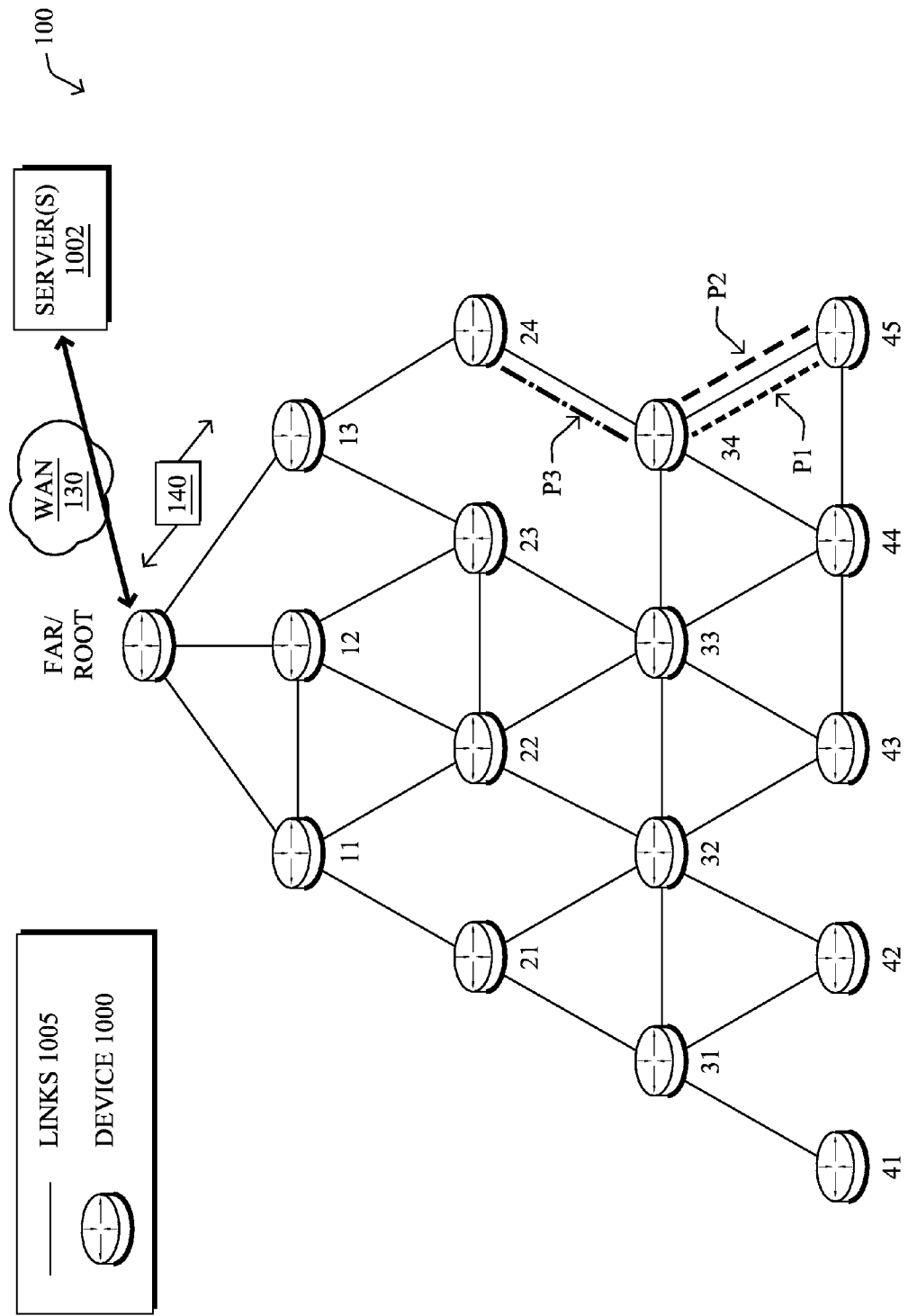
FIGS. 12A-12D illustrate a simplified example of routing paths being selected based on identified communication channels.

FIGS. 12A-12D illustrate a simplified example of routing paths being selected based on identified communication channels. As shown in FIG. 12A, a single communication channel may exist without crosstalk between nodes/devices 24 and 34 using electrical phase P1. In addition, two channels may exist without crosstalk between nodes/devices 34 and 45 using electrical phases P1 and P2. In various cases, the number of distinct communication channels available between neighboring devices in network 100 may be reported to a path computation engine (PCE), such as the root node or even server(s) 1002. For example, information regarding the communication channels available between nodes/devices 34 and 45 may be reported back to the root node using a message format similar to message 1100 shown in FIG. 11. In some embodiments, information regarding any detected crosstalk may also be provided to the PCE. For example, assume that crosstalk effects present between phases P1 and P3 prevents the link between nodes 34 and 45 from using all three communication channels. In this case, such information may be reported back to the PCE for further processing.

Figure 12B:
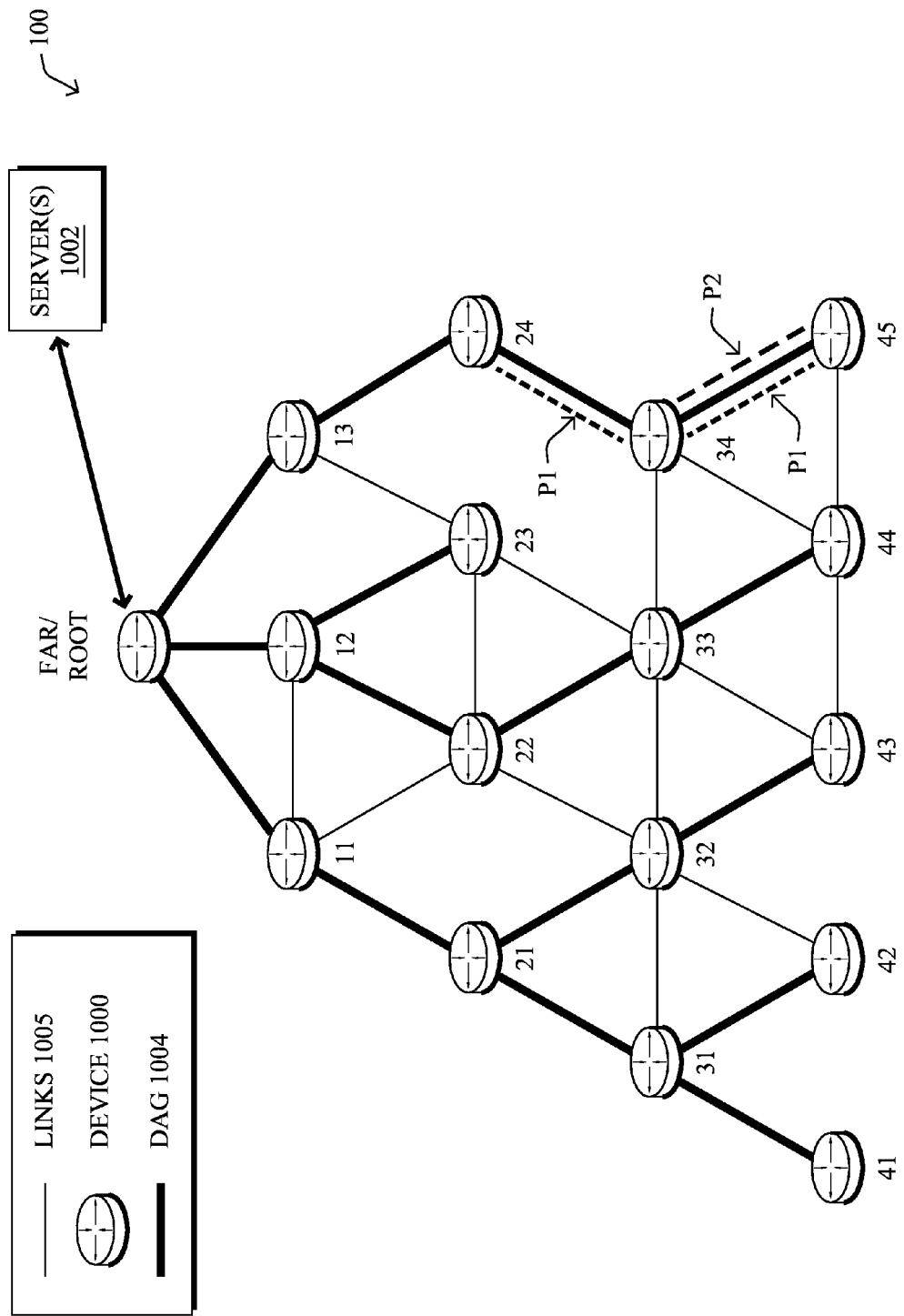
Figure 12C:
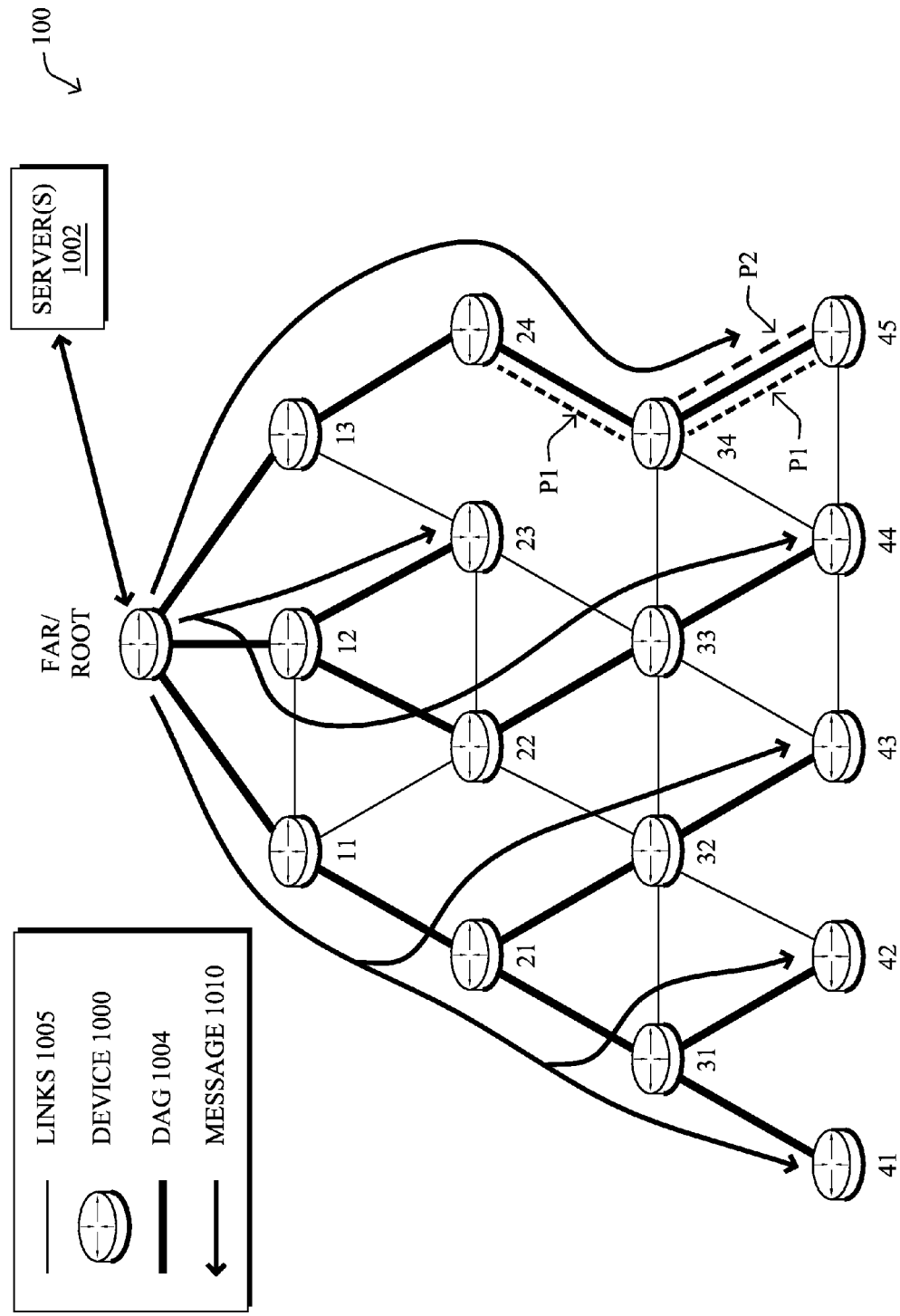

According to various embodiments, the PCE form paths that take into account the number of distinct channels available at each link along a path. To increase end-to-end reliability and decrease communication latency, the PCE may attempt to compute paths that utilize links that offer multiple distinct channels through different electric phases. For example, as shown in FIGS. 12B-12C, the PCE may decide to make use of the multiple communication channels available between nodes/devices 34 and 45. There may also be cases where the path that maximizes the number of links that offer distinct channels appears worse in other metrics (e.g., latency) when compared to other paths. In such cases, a threshold may be used by the PCE to determine how much sacrifice to make. In one embodiment, the amount of sacrifice may be dependent on the particular traffic being forwarded (i.e., through Traffic Class markings). Even if a path may look longer in terms of delay (e.g., because of interferences and retransmissions), it may in fact make use of links with higher data rate. However, lots of retransmissions also leads to higher latency, so knowing the level of crosstalk helps with robustness but also delays.

Figure 12D:
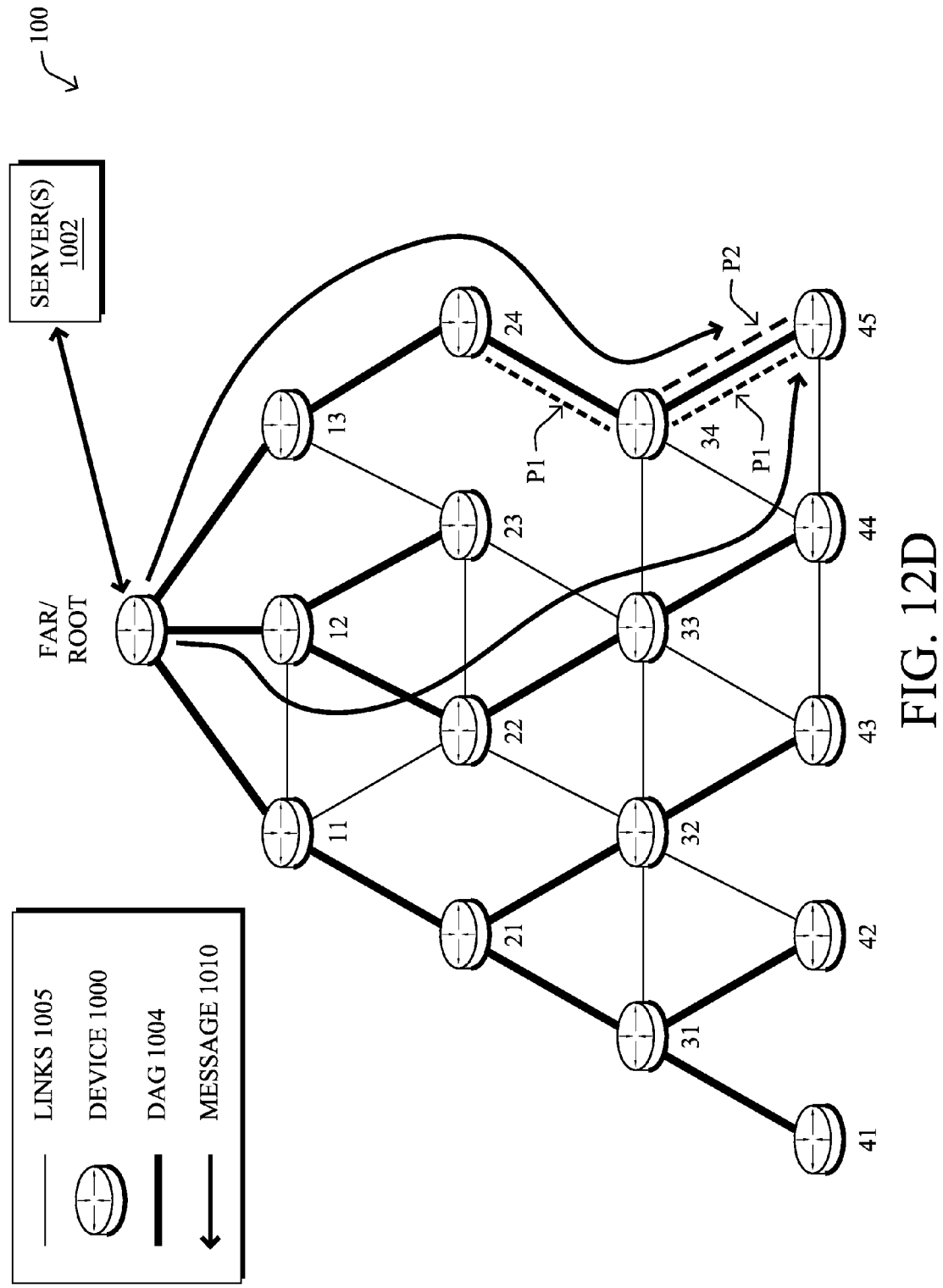

In some embodiments, the channel and crosstalk information provided to the PCE may be used by the PCE to compute disjoint paths that minimize self-interference. Because the PCE has information about what channels are available and their crosstalk effects, the PCE can determine the degree of self-interference between two paths. For example, a path that involves having neighboring devices communicate on different electric phases that do not experience crosstalk offers enables increased communication capacity and robustness. Note that the disjoint paths may be to the same destination or different destinations. Disjoint paths are important for supporting 1+1 for enhanced reliability or delivering different packets simultaneously. For example, as shown in FIG. 12D, the PCE may generate disjoint paths to node 45 that take into account the crosstalk effects identified by the nodes.

Figure 13:
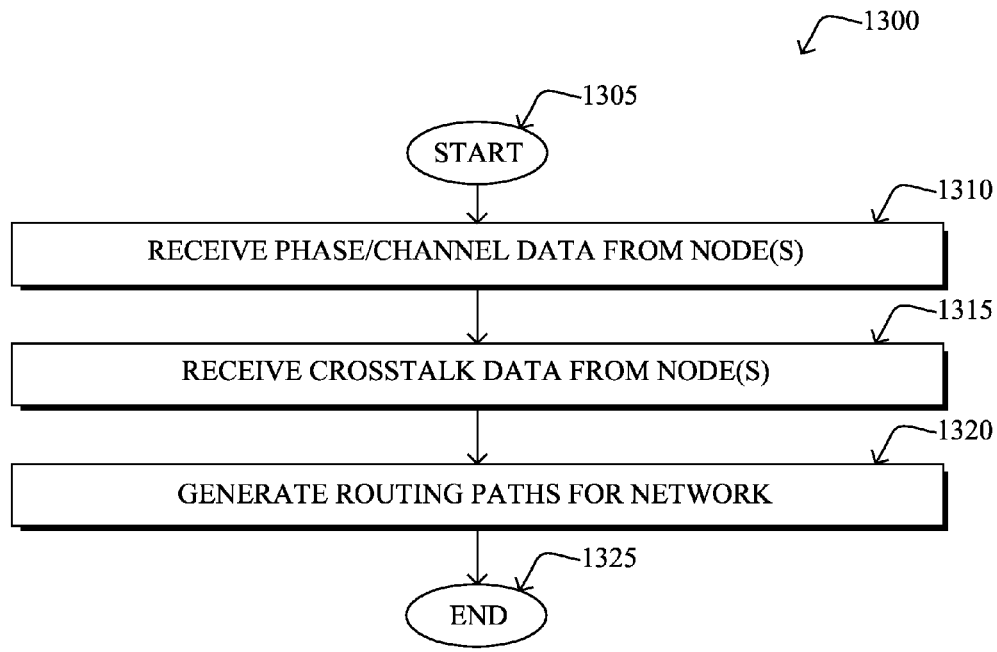
FIG. 13 illustrates a simplified procedure for generating routing paths based on available communication channels.

FIG. 13 illustrates an example simplified procedure for selecting routing paths in a shared-media communication network in accordance with one or more embodiments described herein. The procedure 1300 may start at step 1305, and continues to step 1310, where, as described in greater detail above, phase/channel data is received from one or more nodes in the network. In other words, information regarding the available communication channels between neighboring nodes is received (e.g., channels that exist on different electrical phases between the devices). In one embodiment, such information may be included in a DAO message or other message reported to a PCE. In some embodiments, the phase/channel data indicates the minimum or total number of distinct channels supported by a given link between neighboring nodes. In another embodiment, such information may include counts of the number of single channel, dual channel, triple channel links, etc., that are supported along a given path in the network.

In step 1315, crosstalk data is received from one or more of the nodes/devices in the network. As described in more detail above, the received crosstalk data may generally include information regarding any detected crosstalk between electrical phases on a given link between neighboring nodes. In one embodiment, the received crosstalk data includes a listing of phases that are affected by the detected crosstalk. In another embodiment, the received crosstalk data identifies a degree of crosstalk that was detected. In further embodiments, the received crosstalk data may include historical network performance metrics that may indicate the presence of crosstalk (e.g., how the characteristics of links changed over time, link quality metrics, etc.).

In step 1320, routing paths for the network are generated based on the received channel and crosstalk data, as described in greater detail above. In some embodiments, paths may be selected to maximize the use of multiple communication channels that exist between nodes. In one embodiment, a threshold may be used to determine whether to use a multi-channel link as part of a path, if the use of the path negatively affects other metrics such as latency. In some embodiments, the threshold (i.e., the amount of acceptable tradeoff between network characteristics) may be selected based on the type of data being forwarded in the network. Procedure 1300 then ends at step 1325.

Figure 14:
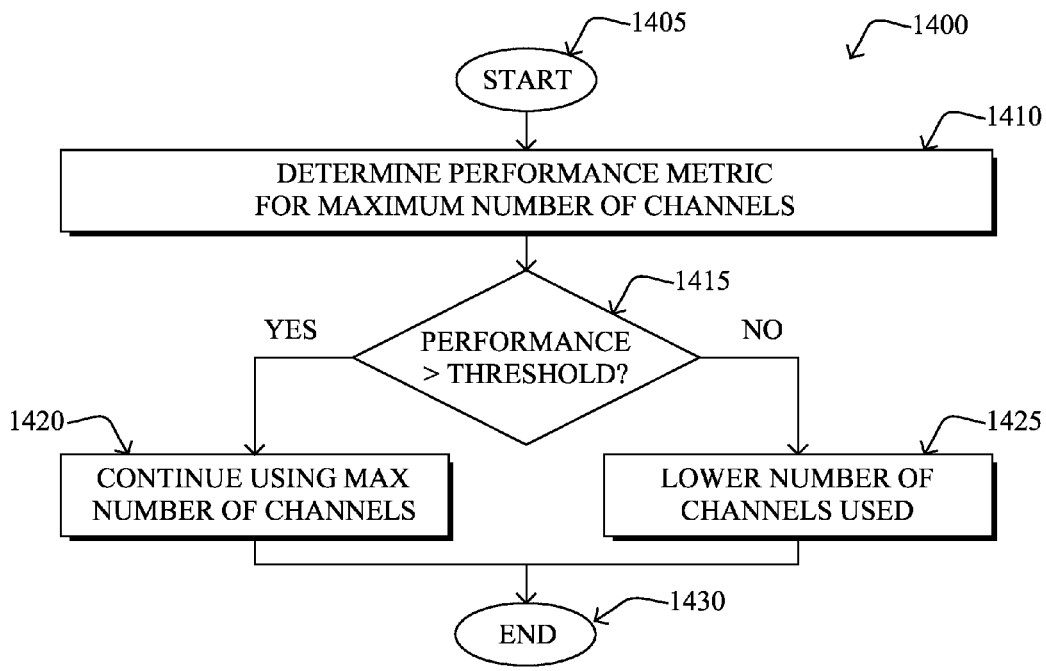
FIG. 14 illustrates a simplified procedure for adjusting routing paths in a network.

FIG. 14 illustrates a simplified procedure for adjusting routing paths in a network, in accordance with one or more embodiments. Procedure 1400 begins at step 1405 and continues on to step 1410 where, as detailed above, a performance metric for the maximum number of communication channels available between network devices is determined. For example, assume that two network nodes are each connected to phases A, B, and C of a tri-phase PLC network. In such a case, the maximum number of channels between the devices is three. In various embodiments, the maximum number of channels may be for a particular communication link or for a path that includes multiple communication links. In another example, the maximum number of channels may correspond to the total number of possible RF connections between nodes plus the total number of possible PLC connections between the nodes. The performance metric may be any metric that categorizes the operation of the links between nodes. For example, the performance metric may be a packet drop rate, a delay measurement, a collision value, combinations thereof, or the like.

At step 1415, the performance metric from step 1410 is compared to a performance threshold. For example, assume that the maximum number of communication channels between two nodes is in use. In such a case, the packet drop rate between the two nodes may be compared to a threshold value to ensure that the channels are operating correctly. If the performance is at or above the threshold, procedure 1400 continues on to step 1420 where the maximum number of channels are continued to be used. Procedure 1400 then ends at step 1430. However, if the performance is below the threshold, procedure 1400 continues on to step 1425 and the number of communication channels is lowered. For example, if the performance of a link between two nodes using PLC phases A and B is below a threshold value, the link may be adjusted to only use one of the two PLC phases. Procedure 1400 then ends at step 1430.

It should be noted that while certain steps within procedures 1300-1400 may be optional as described above, the steps shown in FIGS. 13-14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1300-1400 are described separately, certain steps from each procedure may be incorporated into each other procedure, and the procedures are not meant to be mutually exclusive.

The techniques described herein, therefore, make use of poly-phase PLC links at the network layer. In some aspects, a routing metric and mechanism is introduced that exposes the number of distinct channels available for links along a path. Furthermore, the number of distinct channel and crosstalk information regarding neighboring nodes/devices may be reported to the network root, allowing the root to compute source routes that maximize the number of distinct channels and multiple disjoint source routes that minimize self-interference. Thus, the described techniques increase the overall robustness of the network, increase network capacity, and reduce communication latency in the network.

While there have been shown and described illustrative embodiments that provide for dynamic enabling of routing devices in a shared-media communication network, it is to be understood that various other adaptations and modifications may be made within the spirit and scope of the embodiments herein. For example, the embodiments have been shown and described herein with relation to PLC networks. In addition, while certain protocols are shown, such as RPL, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
  receiving, at a path computation engine in a network, communication channel data regarding one or more communication channels available between a particular device in the network and a neighboring device, wherein each communication channel comprises one or more electrical phases over which the particular device can communicate with the neighboring device, and wherein the communication channel data comprises a count of single-phase channels, a count of dual-phase channels, and a count of tri-phase channels between the particular device and the neighboring device;
  receiving, at the path computation engine, crosstalk data regarding an amount of crosstalk between the electrical phases over which the particular device can communicate with the neighboring device; and
  generating, by the path computation engine, a routing path in the network based on the received crosstalk and communication channel data.

2. The method as in claim 1, further comprising:
  using the crosstalk data to select disjoint paths in the network that minimize self-interference between two paths in the network.

3. The method as in claim 1, wherein receiving the communication channel data comprises:
  receiving a minimum number of distinct communication channels between the particular device and the neighboring device.

4. The method as in claim 1, wherein receiving the crosstalk data comprises:
  receiving a listing of one or more electric phases that are affected by crosstalk when a communication is sent via a particular electric phase.

5. The method as in claim 1, wherein receiving the crosstalk data comprises:
receiving a measured degree of crosstalk present when a communication is sent between the devices via a particular electric phase.

6. The method as in claim 1, wherein the crosstalk and communication channel data is received via a destination advertisement object (DAO) message.

7. The method as in claim 1, further comprising:
determining a network performance metric associated with using a maximum number of distinct communication channels between the devices;
comparing the network performance metric to a threshold value; and
including less than the maximum number of distinct communication channels between the devices in the path.

8. The method as in claim 7, wherein the network performance metric corresponds to network latency.

9. The method as in claim 1, wherein the routing path is generated based on a history of crosstalk data.

10. A path computation engine apparatus comprising:
one or more network interfaces configured to communicate in a power line communication (PLC) network;
a processor configured to execute one or more processes; and
a memory configured to store a process executable by the processor, the process when executed operable to:
receive communication channel data regarding one or more communication channels available between a particular device in the network and a neighboring device, wherein each communication channel comprises one or more electrical phases over which the particular device can communicate with the neighboring device, and wherein the communication channel data comprises a count of single-phase channels, a count of dual-phase channels, and a count of tri-phase channels between the particular device and the neighboring device;
receive crosstalk data regarding an amount of crosstalk between the electrical phases over which the particular device can communicate with the neighboring device; and
generate a routing path for the network based on the received crosstalk and communication channel data.

11. The apparatus as in claim 10, wherein the process when executed is operable to:
use the crosstalk data to select disjoint paths in the network that minimize self-interference between two paths in the network.

12. The apparatus as in claim 10, wherein the communication channel data comprises a minimum number of distinct communication channels between the particular device and the neighboring device.

13. The apparatus as in claim 10, wherein the crosstalk data comprises a listing of one or more electric phases that are affected by crosstalk when a communication is sent via a particular electric phase.

14. The apparatus as in claim 13, wherein the crosstalk data comprises a measured degree of crosstalk present when a communication is sent between the devices via a particular electric phase.

15. The apparatus as in claim 10, wherein the crosstalk and communication channel data is received via a destination advertisement object (DAO) message.

16. The apparatus as in claim 10, wherein the process when executed is operable to:
determine a network performance metric associated with using a maximum number of distinct communication channels between the devices;
compare the network performance metric to a threshold value; and
include less than the maximum number of distinct communication channels between the devices in the path.

17. The apparatus as in claim 16, wherein the network performance metric corresponds to network latency.

18. A tangible, non-transitory, computer-readable media having software encoded thereon, the software, when executed by a processor of a path computation engine, operable to:
receive communication channel data regarding one or more communication channels available between a particular device in the network and a neighboring device, wherein each communication channel comprises one or more electrical phases over which the particular device can communicate with the neighboring device, and wherein the communication channel data comprises a count of single-phase channels, a count of dual-phase channels, and a count of tri-phase channels between the particular device and the neighboring device;
receive crosstalk data regarding an amount of crosstalk between the electrical phases over which the particular device can communicate with the neighboring device;
generate a routing path for the network based on the received crosstalk and communication channel data.

* * * * *